(12) United States Patent
Futa et al.

(10) Patent No.: US 8,280,039 B2
(45) Date of Patent: Oct. 2, 2012

(54) SIGNATURE GENERATING DEVICE, SIGNATURE GENERATING METHOD AND SIGNATURE GENERATING PROGRAM

(75) Inventors: Yuichi Futa, Osaka (JP); Motoji Ohmori, Osaka (JP); Masahiro Mambo, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1141 days.

(21) Appl. No.: 12/158,033

(22) PCT Filed: Dec. 26, 2006

(86) PCT No.: PCT/JP2006/325945
§ 371 (c)(1),
(2), (4) Date: Jun. 18, 2008

(87) PCT Pub. No.: WO2007/074836
PCT Pub. Date: Jul. 5, 2007

(65) Prior Publication Data
US 2009/0094464 A1   Apr. 9, 2009

(30) Foreign Application Priority Data
Dec. 28, 2005 (JP) ................................. 2005-379129

(51) Int. Cl.
*H04L 29/06* (2006.01)
(52) U.S. Cl. ........................... 380/28; 713/168; 713/180
(58) Field of Classification Search ...................... 380/28
See application file for complete search history.

(56) References Cited

U.S. PATENT DOCUMENTS

| 5,999,626 | A | * | 12/1999 | Mullin et al. ................. 713/172 |
| 6,480,605 | B1 | | 11/2002 | Uchiyama et al. |
| 6,594,761 | B1 | | 7/2003 | Chow et al. |
| 6,873,706 | B1 | | 3/2005 | Miyazaki et al. |
| 2007/0192622 | A1 | | 8/2007 | Futa et al. |

FOREIGN PATENT DOCUMENTS

| JP | 11-174955 | 7/1999 |
| WO | 01/24439 | 4/2001 |

(Continued)

OTHER PUBLICATIONS

A. J. Menezes, "Elliptic Curve Public Key Cryptosystems", Kluwer Academic Publishers, 1993.

(Continued)

*Primary Examiner* — Edward Zee
*Assistant Examiner* — Yogesh Paliwal
(74) *Attorney, Agent, or Firm* — Wenderoth, Lind & Ponack, L.L.P.

(57) ABSTRACT

A signature generation apparatus is capable of making a value used in signature generation processing difficult to analyze. In the signature generation apparatus, a random number generation module generates a len-bit random number u, a selection module converts the generated random number u into a bit expression, and acquires element pairs corresponding to the bit values from a table memory unit. A random element generation module applies a basic operation of a first group G and a second group to all acquired element pairs, and calculates an element Pk on the first group G and an element Pak on the second group Ga. The signature generation apparatus generates a digital signature S for a message m with use of a transformation module, a main operation module, an inverse transformation module, a multiplication module, a division module, and a signature data generation module.

14 Claims, 10 Drawing Sheets

FOREIGN PATENT DOCUMENTS

WO 2005/098795 10/2005

OTHER PUBLICATIONS

International Search Report issued Mar. 6, 2007 in the International (PCT) Application of which the present application is the U.S. National Stage.

Kunihiro et al., "Two Discreate Log Algorithms for Super-Anomalous Elliptic Curves", SCIS, 1999, pp. 869-874.

Bellare et al., "'Pseudo-Random' Number Generation Within Cryptographic Algorithms: The DDS Case", Springer-Verlag, 1998, pp. 277-291.

* cited by examiner

FIG. 3

| TABLE MEMORY UNIT | | |
|---|---|---|
| TABLE 0 (T110) | 0 | 1 |
| E | VALUE OF $v\_(0,0) *P$ $(=P\_(0,0))$ | VALUE OF $v\_(1,0) *P$ $(=P\_(1,0))$ |
| Ea | VALUE OF $v\_(0,0) *Pa$ $(=Pa\_(0,0))$ | VALUE OF $v\_(1,0) *Pa$ $(=Pa\_(1,0))$ |
| TABLE 1 (T111) | 0 | 1 |
| E | VALUE OF $v\_(0,1) *P$ $(=P\_(0,1))$ | VALUE OF $v\_(1,1) *P$ $(=P\_(1,1))$ |
| Ea | VALUE OF $v\_(0,1) *Pa$ $(=Pa\_(0,1))$ | VALUE OF $v\_(1,1) *Pa$ $(=Pa\_(1,1))$ |
| TABLE len−1 | 0 | 1 |
| E | VALUE OF $v\_(0,\text{len}-1) *P$ $(=P\_(0,\text{len}-1))$ | VALUE OF $v\_(1,\text{len}-1) *P$ $(=P\_(1,\text{len}-1))$ |
| Ea | VALUE OF $v\_(0,\text{len}-1) *Pa$ $(=Pa\_(0,\text{len}-1))$ | VALUE OF $v\_(1,\text{len}-1) *Pa$ $(=Pa\_(1,\text{len}-1))$ |

SIGNATURE GENERATING DEVICE, SIGNATURE GENERATING METHOD AND SIGNATURE GENERATING PROGRAM

TECHNICAL FIELD

The present invention relates to a method for obfuscating software as an information security technique, and in particular to a technique for obfuscating a digital signature method.

BACKGROUND ART

When implementing encryption software, if the key, encryption algorithm and the like are implemented without any countermeasures, the software can be analyzed and easily used maliciously. For this reason, there are demands for tamper-resistant software that is difficult to analyze. As one tamper-resistant software technique, Patent Document 1 discloses a scheme for transforming operations and operation domains to make the original operation domain difficult to guess. This scheme makes the software difficult to analyze.

The transformation used in the described scheme is linear transformation or the like. For instance, in order to transform an addition of a key and data, the key and data are transformed, the obtained data is added in a transformed domain, and the result of the addition is inverse-transformed. This obtains the same result as adding the key and the data. When applied to an encryption program, a decryption program, or the like that uses shared key encryption, this kind of obfuscated addition method increases the security of the program against attacks that analyze programs to obtain keys.

The following describes a specific example of the technique disclosed by Patent Document 1.

Here, a description is given of an addition program that outputs an operation result a+b with respect to input a and b, and is composed of a transformation module, a main operation module, an inverse transformation module, and an output module.

The transformation module holds integers k1 and k2. The inverse transformation module receives input values a and b, and with use of the held integers k1 and k2, transforms the input values a and b into ta=k1×a+k2 and tb=k1×b+k2, respectively. Note that "×" represents multiplication. Next, the main operation module calculates tab=ta+tb with respect to the values ta and tb. The inverse transformation module calculates c=(tab−2×k2)/k1 with respect to tab. The output module outputs an operation result c.

According to the above-described processing, from tab=ta+tb=k1×a+k2+k1×b+k2=k1×(a+b)+2×k2, (tab−2× k2)/k1=a+b is established. Consequently, c=a+b, and the addition program can calculate the addition result of a and b from the input values a and b.

Here, if the transformation module and the inverse transformation module are realized in a manner that makes analysis difficult, the only data that a third party (analyzer) will be able to obtain by analyzing is the values ta, tb and tab. Since a and b are difficult to guess from these values, a and b can be concealed.

In Patent Document 1, the data is transformed according to linear transformation, thus making the data itself difficult to analyze. However, the type of operation, in other words addition, is the same in the transformation destination, and therefore this system does not go as far as to conceal the type of operation.

In patent document 2, the type of operation is concealed by transforming addition into multiplication or addition of a group of an elliptic curve based on a discrete logarithm problem that has a trapdoor and therefore can be easily solved by a party in possession of certain information (i.e., the trapdoor).

A description is now given of a conventional elliptic DSA (digital signature algorithm) signature scheme. Note that the following description will be kept brief since details of a conventional elliptic DSA signature can be found on page 4 of Non-Patent Document 3.

(1) Parameters

In a conventional elliptic DES signature scheme, the parameters are variables a and b in an equation y^2=x^3+ax x+b of an elliptic curve, a finite field GF(p) of the elliptic curve E, a base point P and an order q of the base point. Here, x^y denotes the y-th power of x, and q and P satisfy q*P=O. O is a zero element of an elliptic curve group, "*" denotes a scalar multiplication on an elliptic curve, and q*P expresses a point on an elliptic curve obtained by adding q base points Ps.

(2) Private Key and Public Key

Let the private key be ks (0<ks<q), and let the public key be KP=ks*P.

(3) Signature Generating

In signature generating in a conventional elliptic DSA signature scheme, a digital signature S of a message m that is to be signed is generated according to the following steps.

Step S1: Calculate h=Hash(m), where Hash(m) is a hash value of m. The hash function used to obtain the hash value may, for instance, be SHA-1. Details of hash functions can be found in Non-Patent Document 1, pages 192-195.

Step S2: Select a random number k, and calculate a point R=k*P on an elliptic curve.

Step S3: Calculate r=x(R)mod q, where x(R) denotes the x coordinate of R.

Step S4: Calculate s=(h+r×ks)/k mod q.

Step S5: Output S=(r,s), end.

(4.) Signature Verification

In signature verification in a conventional elliptic DSA signature scheme, the digital signature S is subjected to verification and a verification result (successful or failure) is output according to the following steps.

Step S10: Calculate h=Hash(m).

Step S11: Calculate R'=(h/s mod q)*P+(r/s mod q)*KP, let r'=x(R').

Step S12: Check whether r=r'. If true, output "success". If false, output "failure" and end processing.

Patent Document 1: U.S. Pat. No. 6,594,761
Patent Document 2: International Publication No. 2005/098795 pamphlet
Patent Document 3:U.S. Pat. No. 3,402,441 specification
Non-Patent Document 1: Tatsuaki OKAMOTO and Hirosuke YAMAMOTO "*Gendai Angou*" ("Modern Encryption"), Sangyou Tosho, 1997
Non-Patent Document 2: Henri Cohen "A Course in Computational Algebraic Number Theory", GTM 138, Springer-Verlag, 1993, pp. 16-19
Non-Patent Document 3: I. Blake, G. Seroussi and N. Smart, "Elliptic Curves in Cryptography", CAMBRIDGE UNIVERSITY PRESS, 1999
Non-Patent Document 4: N. Kunihiro and K. Koyama, "Two Discrete Log Algorithms for Super-Anomalous Elliptic Curves", SCIS '99, 1999, pp. 869-874

DISCLOSURE OF THE INVENTION

Problem to be Solved by the Invention

In signature generating in a conventional elliptic DSA signature scheme, not only the private key ks but also the random number k must be kept secret. This is because if the random number k becomes known to a third party, it will be possible for the third party to calculate backward ks using the equation of step S4.

With the scheme of the described conventional example, since operations (additions) are transformed, the parts that use those operations can be made difficult to analyze. In signature generation in a conventional elliptic DSA signature scheme, however, the random number k cannot be made difficult to analyze.

In view of the stated issue, the present invention has an object of providing a signature generation apparatus, a signature generation method, a signature generation program, a recording medium and an integrated circuit that make values used in signature generation processing difficult to analyze.

Means to Solve the Problem

In order to achieve the stated object, the present invention is a signature generation apparatus for generating a digital signature for a message by applying a power operation, the power operation being a basic operation performed a plurality of times with respect to a basic element P in a group G and a basic element Pa in a group Ga, and security of the digital signature being based on a discrete logarithm problem on the group G and the group Ga, wherein a plurality of split groups and a plurality of numbers are corresponded with each other in advance, each split group including a plurality of split pairs, each split pair including a first split value and a second split value, each first split value being an element that belongs to the group G and that is calculated by applying, to the basic element P, a power operation in which a power is an arbitrary positive integer, and each second split value being an element that belongs to the group Ga and that is calculated by applying, to the basic element Pa, a power operation in which a power is the positive integer used with respect to the one of the first split values that is in the same pair, the signature generation apparatus including: a split value storage unit operable to store the split groups; a selection unit operable to select a number u randomly from among the plurality of numbers, and select a split group corresponding to the selected number u from among the split groups stored in the split value storage unit; a generation unit operable to (a) apply a basic operation of the group G to the two or more first split values in the selected split group, thereby generating a first exponential element, and (b) apply a basic operation of the group Ga to the second split values in the selected split group that correspond to the two or more first split values, thereby generating a second exponential element; and a signature unit operable to (a) transform each of the generated first exponential element and the message into an element in the group Ga, (b) apply an operation on the group Ga to the transformed first exponential element, the transformed message and the second exponential element, to calculate a first discrete logarithm and a second discrete logarithm, and (c) generate a digital signature for the message with use of the calculated first and second discrete logarithms.

Effects of the Invention

According to the stated structure, the signature generation apparatus is capable of concealing not only the values used in the digital signature, but also the operations themselves.

Here, each of the plurality of numbers may be a number expressed as a bit string having a predetermined length, the predetermined length being two bits or longer, each bit value in the bit string having the predetermined length may be corresponded with a split pair among the plurality of split pairs, and the selection unit may transform the selected number u into a bit expression having the predetermined length, and select, from the split value storage unit, the split group composed of split pairs each of which is corresponding to the value of each bit in the bit expression.

According to the stated structure, the signature generation apparatus can easily select concealed values to use.

Here, the generation unit may apply the basic operation in the group G to the two or more first split values in the split group composed of the split pairs each of which is selected in accordance with the values of the each bit, thereby generating the first exponential element, and apply the basic operation in the group Ga to the second split values that are in the selected split group composed of the split pairs each of which is selected in accordance with the values of the each bit and each of which corresponds to each of the two or more first split values, thereby generating the second exponential element.

According to the stated structure, the values and operations used in the basic operation in the group G and the group Ga can be concealed.

Here, the first exponential element may include two or more values, and the signature unit may include: a transformation sub-unit operable to apply the power operation in the group Ga to the basic element Pa with use of a hash value of the message as a power, thereby transforming the hash value into a transformed hash value belonging to the group Ga; a first operation sub-unit operable to calculate first data with use of one of the values in the first exponential element; a second operation sub-unit operable to apply the basic operation on the group Ga to the transformed hash value, to calculate a third exponential element belonging to the group Ga; an inverse transformation sub-unit operable to apply an inverse operation to each of the second exponential element and the third exponential element in one of the group Ga and a sub-group Sa truly included the group Ga, thereby finding first and second discrete logarithms, the inverse operation being an inverse of the transformation performed in the transformation sub-unit; a third operation sub-unit operable to calculate second data with use of the first and second discrete logarithms; and a data generation sub-unit operable to generate the digital signature composed of the first data and the second data.

According to the stated structure, the signature generation apparatus is capable of concealing the values and operations used in the signature unit.

Here, the signature generation apparatus may further include: a transformed private key storage unit operable to store a transformed private key belonging to the group Ga, the transformed private key being generated by applying the basic operation in the group Ga using a private key as power, wherein the second operation sub-unit applies the basic operation on the group Ga to (i) an operation result that is an element of the group Ga and is obtained by applying, to the transformed secret key, a power operation of the group Ga in which the first data is a power and (ii) the transformed hash value, thereby calculating the third exponential element.

According to the stated structure, the signature generation apparatus is capable of concealing the values and operations used in the second operation sub-unit.

Here, each of the group G and the group Ga may be a multiplicative group of a residue integer ring, each of the basic operation in the group G and the basic operation in the group Ga may be a multiplicative operation that subjects each element in the respective one of the group G and the group Ga to multiplication, and each of the power operation in the group G and the power operation in the group Ga may be an exponentiation whose power value is a positive integer.

According to the stated structure, the signature generation apparatus is able to conceal the operations used in generating the first, second and third exponential elements because the operations are multiplicative operations, not exponentiations.

Here, the group G may be a group of an elliptic curve, the subgroup Sa may be a group of an anomalous elliptic curve, each of the basic operation in the group G and the basic operation in the group Ga may be an operation that applies addition on an elliptic curve to each element in the respective one of the group G and the group Ga, and each of the power operation in the group G and the power operation in the group Ga may be an operation that applies multiplication on an elliptic curve to a positive integer. Furthermore, the group G may be a group of an elliptic curve, the group Ga may be a direct product of two anomalous elliptic curves, each of the basic operation in the group G and the basic operation in the group Ga may be an operation that applies addition on an elliptic curve to each element in the respective one of the group G and the group Ga, and each of the power operation in the group G and the power operation in the group Ga may be an operation that applies multiplication on an elliptic curve to a positive integer.

According to the stated structure, the signature generation apparatus is able to conceal the operations used to generate the first, second and third exponential elements because the operations is are addition operations on an elliptic curve, not addition of integers.

Furthermore, the present invention is a signature generation apparatus for generating a digital signature for a message by applying a power operation, the power operation being a basic operation performed a plurality of times with respect to a basic element P in a group G and a basic element Pa in a group Ga, and security of the digital signature being based on a discrete logarithm problem on the group G and the group Ga, wherein a plurality of split groups and a plurality of numbers are corresponded with each other in advance, each split group including a plurality of split pairs, each split pair including a first split value and a second split value, each first split value being an element that belongs to the group G and that is calculated by applying, to the basic element P, a power operation in which a power is an arbitrary positive integer, and each second split value being an element that belongs to the group Ga and that is calculated by applying, to the basic element Pa, a power operation in which a power is the positive integer used with respect to the one of the first split values that is in the same pair, the signature generation apparatus including: a split value storage unit operable to store the split groups; a selection unit operable to select a number u randomly from among the plurality of numbers, and select a split pair corresponding to the selected number u from the split value storage unit; and a signature unit operable to (a) transform each of the message and the first split value in the selected split pair into an element on the group G, (b) apply an operation on the group Ga to the transformed first split value, the transformed message and the second split value in the selected split pair, to solve a discrete logarithm problem in order to calculate first and second discrete logarithms, and (c) generate a digital signature for the message with use of the calculated first and second discrete logarithms.

According to the stated structure, the signature generation apparatus is capable of concealing values used in a digital signature.

BRIEF DESCRIPTION OF THE DRAWINGS

FIG. 3 shows an example of the data structure of tables stored in a table memory unit 102;

DESCRIPTION OF NUMERICAL REFERENCES

Figure 1:
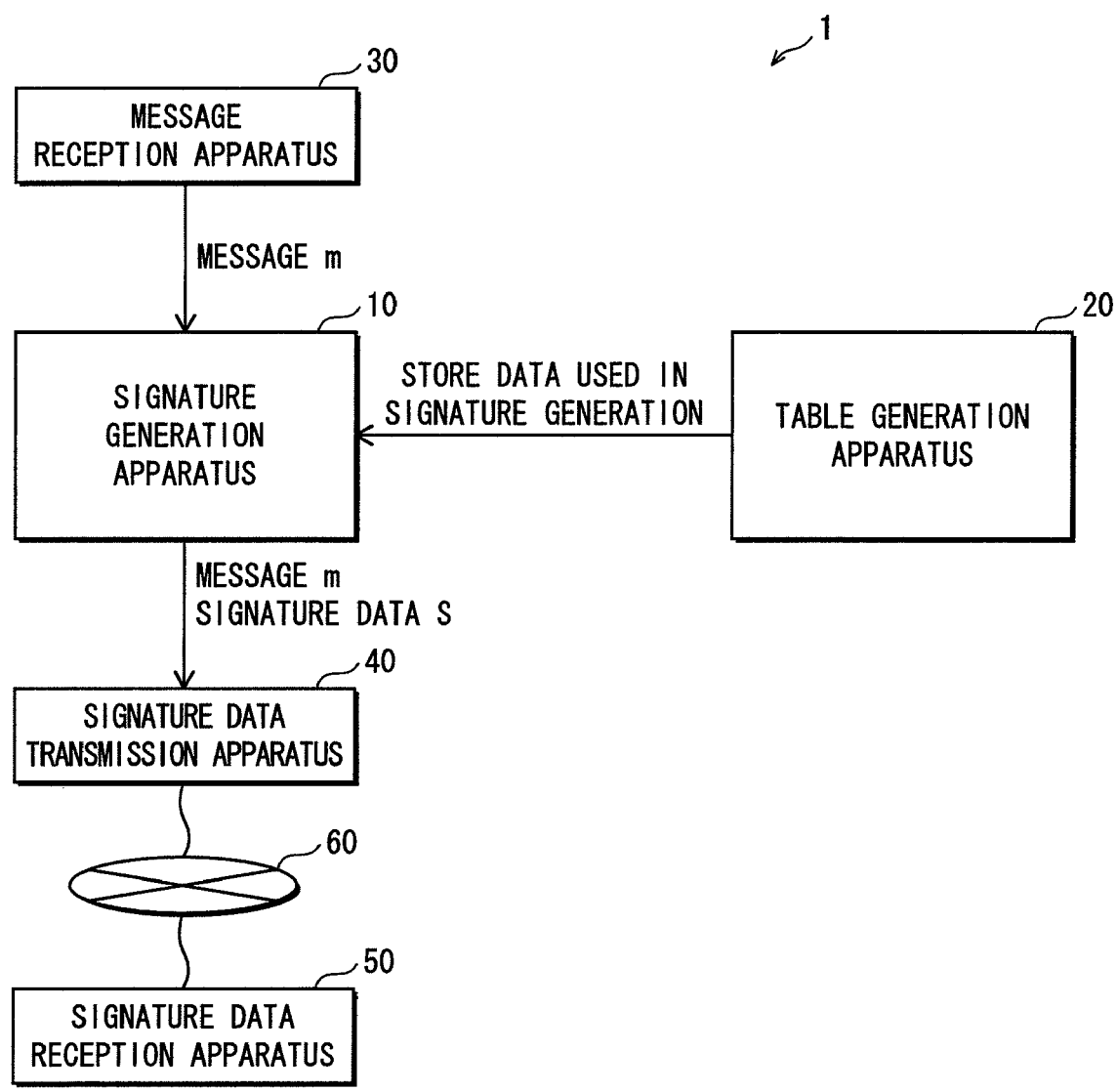
FIG. 1 is a block diagram showing an overview of a signature generation system 1.

1 Signature generation system
10 Signature generation apparatus
20 Table generation apparatus
30 Message reception apparatus
40 Signature data transmission apparatus
50 Signature data reception apparatus
60 The Internet
101 Processor
102 Table memory unit
103 Private parameter memory unit
104 Public parameter memory unit
105 Transformed private key memory unit
106 Program memory unit
110 Signature generation program
121 Hash value generation module
122 Random number generation module
123 Selection module
124 Random element generation module
125 Transformation module
126 Main operation module
127 Inverse transformation module
128 Multiplication module
129 Division module
130 Signature data generation module
201 Public parameter memory unit
202 Random number generation unit
203 Group operation unit
204 Storage processing unit

BEST MODE FOR CARRYING OUT THE INVENTION

The following describes preferred embodiments for carrying out the invention, with reference to the drawings.

1. First Embodiment

1.1 Preliminary

A description is now given of scalar multiplication operations on an elliptic curve, which is necessary to describe the embodiments of the present invention.

Calculation of 100*P is described as one example.

Expressed as 100*P=2 (2(P+2(2(2(P+2P))))), 100*P is calculated by six doublings and two additions of a point on an elliptic curve.

In this way, a scalar multiplication operation comes down to doublings and additions on an elliptic curve.

Here, let the equation of the elliptic curve be $y^2=x^3+ax+b$, let the coordinates of an arbitrary point P on the elliptic curve be (x1, y1), and let the coordinates of an arbitrary point Q on the elliptic curve be (x2, y2), where coordinates of a point R determined by R=P+Q are (x3, y3).

When E≠Q, R=P+Q is an addition operation on the elliptic curve. The formula for addition is as follows.

$$x3=\{(y2-y1)/(x2-x1)\}^2-x1-x2$$

$$y3=\{(y2-y1)/(x2-x1)\}(x1-x3)-y1$$

When P=Q, then R=P+Q=P+P=2×P, and R=P+Q is a doubling operation on the elliptic curve. The formula for the doubling is as follows.

$$x3=\{(3\times x1^2+a)/(2\times y1)\}^2-(2\times x1)$$

$$y3=\{(3\times x1^2+a)/(2\times y1)\}(x1-x3)-y1$$

The above operations are performed on the finite field defined by the elliptic curve.

Note that details of elliptic curve formulas can be found in "Efficient elliptic curve exponentiation" (by Miyaji, Ono and Cohen, Advances in Cryptology—Proceedings of ICICS '97, Lecture Notes in Computer Science, 1997, Springer-Verlag, 282-290).

1.2 Structure of Signature Generation System 1

A description is now given of a signature generation system 1 as an embodiment of the present invention.

As shown in FIG. 1, the signature generation system 1 is composed of a signature generation apparatus 10, a table generation apparatus 20, a message reception apparatus 30, a signature data transmission apparatus 40, and a signature data reception apparatus 50.

The message reception apparatus 30 receives a message m according to a user operation, and outputs the received message m to the signature generation apparatus 10.

The table generation apparatus 20 generates a plurality of element pairs for use in the signature generating in the elliptic DSA signature scheme of the present invention (hereinafter, simply referred to as DSA signature scheme), and a transformed private key, and stores the generated element pairs and transformed private key in the signature generation apparatus 10. Here, each of the element pairs is a set of an element of a group of a first elliptic curve and an element of a group of a second elliptic curve. The transformed private key is the data obtained as a result of subjecting a private key to a scalar multiplication operation on the second elliptic curve.

Details of the element pairs and transformed private key are given later.

The signature generation apparatus 10 receives the message m from the message reception apparatus 30, and generates signature data S(=(r,s)) by performing signature generation according to elliptic DSA signature scheme with respect to the received message m.

The signature generation apparatus 10 outputs the generated signature data S and the message m received from the message reception apparatus 30 to the signature data transmission apparatus 40.

The signature data transmission apparatus 40 is connected to the signature data reception apparatus 50 via a network such as the Internet 60 for instance. The signature data transmission apparatus 40 receives the message m and the signature data S of the message m from the signature generation apparatus 10, and transmits the received message m and signature data S to the signature data reception apparatus 50 via the Internet 60.

The signature data reception apparatus 50 receives the message m and the signature data S of the message m from the signature data transmission apparatus 40 via the Internet 60, and performs signature verification.

1.3 Structure of Signature Generation Apparatus 10

A description is now given of the signature generation apparatus 10.

Figure 2:
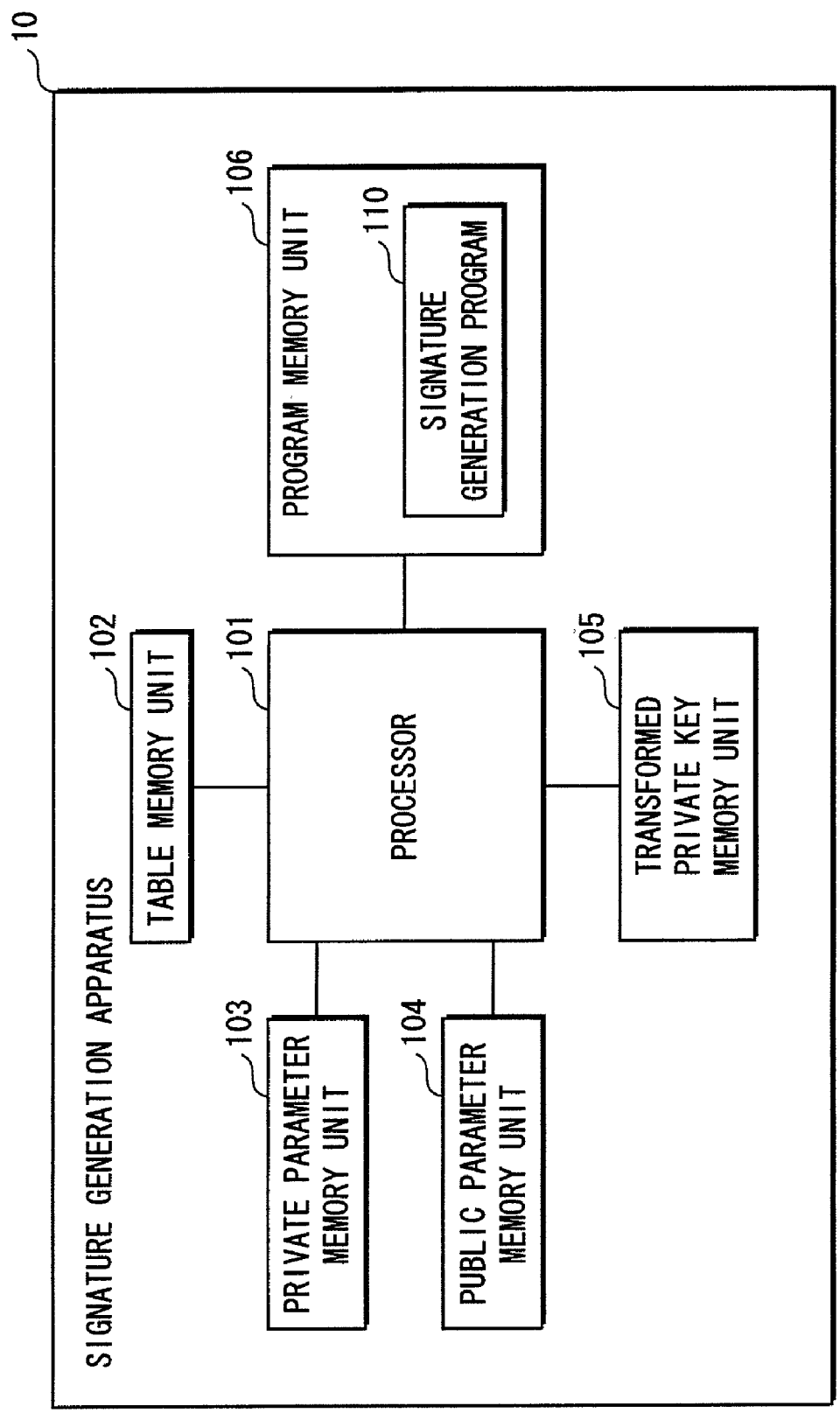
FIG. 2 is a block diagram showing the structure of a signature generation apparatus 10.

As shown in FIG. 2, the signature generation apparatus 10 is composed of a processor 101, a table memory unit 102, a private parameter memory unit 103, a public parameter memory unit 104, a converted private key memory unit 105, and a program memory unit 106.

(1) Processor 101

The processor 101 constitutes a computer system, and achieves its functions by loading a signature generation program 110 stored in the program memory unit 106 and by the loaded signature generation program 110 and hardware resources operating in coordination.

The processor 101 reads one computer instruction at a time from the signature generation program 110 stored in the program memory unit 106, interprets the read computer instruction, and operates in accordance with the result of the interpretation.

Details of the signature generation program 110 are given later.

(2) Table Memory Unit 102

The table memory unit 102 stores therein a plurality of element pairs, each of which consists of an element belonging to a first group G and an element belonging to a second group Ga. These element pairs are generated in the table generation apparatus 20.

(2-1) First Group G and Second Group Ga

The first group G is a group of elements that are points on an elliptic curve E used in the elliptic DSA signature scheme, where the equation of the elliptic curve E is $y^2=x^3+ax+b$, and supposing that E(GF(p)) is a group consisting of points on an elliptic curve over a field GF(p) having the equation of the elliptic curve E, the first group G is E(GF(p)).

The second group Ga is the direct product Ea(GF(p1))×Ea(GF(p2)) of a group Ea(GF(p1)) consisting of points on an elliptic curve Ea over GF(p1) and a group Ea(GF(p2)) consisting of points on an elliptic curve Ea over GF(p2), where n=p1×p2. Since Z/nZ is a is ring, not a field, the phrase "elliptic curve over Z/nZ" is not mathematically accurate, however, for they sake of convenience, the direct product will be referred to as a "group of an elliptic curve over Z/nZ". Note that Z is an integer ring, and Z/nZ is an integer residue class ring in a modulus n.

Here, the formula of the elliptic curve Ea is $y^2=x^3+aa\times x+ba$. The integers p1 and p2 are numbers different to the order q of the base point of the elliptic curve E, and it is assumed that these are generated and administered in a manner that prevents them from being known to a third party.

A point Pa=(xa,ya)mod n on the elliptic curve Ea(GF(p1))×Ea(GF(p2)) over Z/nZ corresponding to a point Pa1=(xa1,ya1)mod p1 over Ea(GF(p1)) and a point Pa2=(xa2,ya2) mod p2 over Ea(GF(p2)) is defined as follows: xa is a number that satisfies xa mod p1=xa1 and xa mod p2=xa2, and ya is a number that satisfies ya mod p1=ya1 and ya mod p2=ya2.

According to this definition, letting the point Pa1 over Ea(GF(p1)) corresponding to a point Pa=(xa, ya)mod n over Ea(GF(p1))×Ea(GF(p2)) be Pa1=(xa1,ya1)mod p1, and letting the point Pa2 over Ea(GF(p2)) corresponding to the point Pa=(xa, ya)mod n over Ea(GF(p1))×Ea(GF(p2)) be Pa2=(xa2,ya2)mod p2, Ea(GF(p1)) and Ea(GF(p2)) can be considered to be subgroups of Ea(GF(p1))×Ea(GF(p2)).

In the elliptic curve Ea, the order of the elliptic curve in mod p1, in other words, the number of points, is p1. This kind of elliptic curve over a field GF(p1) is called an anomalous elliptic curve. Further, the order of the elliptic curve in mod p2 is p2, in other words, the elliptic curve is also an anomalous elliptic curve over GF(p2). In this case, the elliptic curve over Z/nZ is called a super-anomalous elliptic curve. Details of super-anomalous elliptic curves can be found in Non-Patent Document 4. In this case, given that the group of the elliptic curve over Z/nZ is Ea(GF(p1))×Ea(GF(p2)), the order of the elliptic curve is n(=p1×p2).

The number of bits of the prime p1 is 2×len+1. Note that the number of bits of p1 may be greater than 2×len+1. Here, as one example, len is 160, and p2 is a prime of a size that will result in the number of bits of n=p1×p2 being 1024.

(2-2) Pair Sets Stored in the Table Memory Unit 102

The table memory unit 102 stores 2×len element pairs PP_(i,j). Here, i is either 0 or 1, and j is a value from 0 to len−1. The underscore ("_") indicates subscript characters, and i and j are indices of PP. PP_(i,j)=(v_(i,j)*P mod p, v_(i,j)*Pa mod n). Here, "*" shows a scalar multiplication on the elliptic curve E in the case of P, and shows a scalar multiplication on the elliptic curve Ea in the case of Pa. Furthermore, v_(i,j) is the value of len bits. Note that the two points in PP_(i,j) have equal scalars.

A description is now given of one example of how the element pairs are stored.

The table memory unit 102 has an area for storing a plurality of element pairs.

As shown in FIG. 3, the table memory unit 102 stores tables T101, T102, ..., T103. In other words, the tables in the table memory unit 102 are len in number.

The table T101 is composed of a table name T110 ("table 0" here), binary items T120 and T121 ("0" and "1" here), and element pairs T130 and T131 in respective ones of the binary items T120 and T121. Given that two element pairs are stored in each one table, the table memory unit 102 stores 2×len element pairs as a result of storing len tables.

The table name T110 is corresponded with the value j. In other words, the table name T110 (table 0) is in correspondence with j=0, and a table name T111 (table 1, here) is in correspondence with j=1. As a result, table names are corresponded with j=0, ..., len−1, respectively.

In the element pair T130, P_(0,0) is v_(0,0)*P mod p, and Pa_(0,0) is v_(0,0)*Pa mod n. In the element pair T131, P_(1,0) is v_(1,0)*P mod p, and Pa_(1,0) is v_(1,0)*Pa mod n. Note that PP_(i,j)=(P_(i,j), Pa_(i,j)).

Each of the element pairs is corresponded with binary notation. Specifically, a binary value is 0 is corresponded with the element pair in the binary item "0", and a binary value is 1 is corresponded with the element pair in the binary item "1".

(3) Private Parameter Memory Unit 103

The private parameter memory unit 103 is tamper resistant, and stores a prime p1.

(4) Public Parameter Memory Unit 104

The public parameter memory unit 104 stores, as parameters, variables a and b in the formula y^2=x^3+a×x+b of the elliptic curve E, a prime p, the base point P of the elliptic curve E and the order q thereof, variables aa and ba in the formula y^2=x^3+aa×x+ba of the elliptic curve Ea, a composite number n(=p1×p2), and a point Pa on the elliptic curve Ea. Note that here storing a point refers to storing the coordinates of the point. Furthermore, p and q are len-bit primes.

(5) Transformed Private Key Memory Unit 105

The transformed private key memory unit 105 stores a transformed private key KST(=ks*Pa), which has been generated in the table generation apparatus 20 by subjecting a private key ks to scalar multiplication on the second elliptic curve Ea to transform the private key ks.

(6) Program Memory Unit 106

The program memory unit 106 stores the signature generation program 110.

Figure 4:
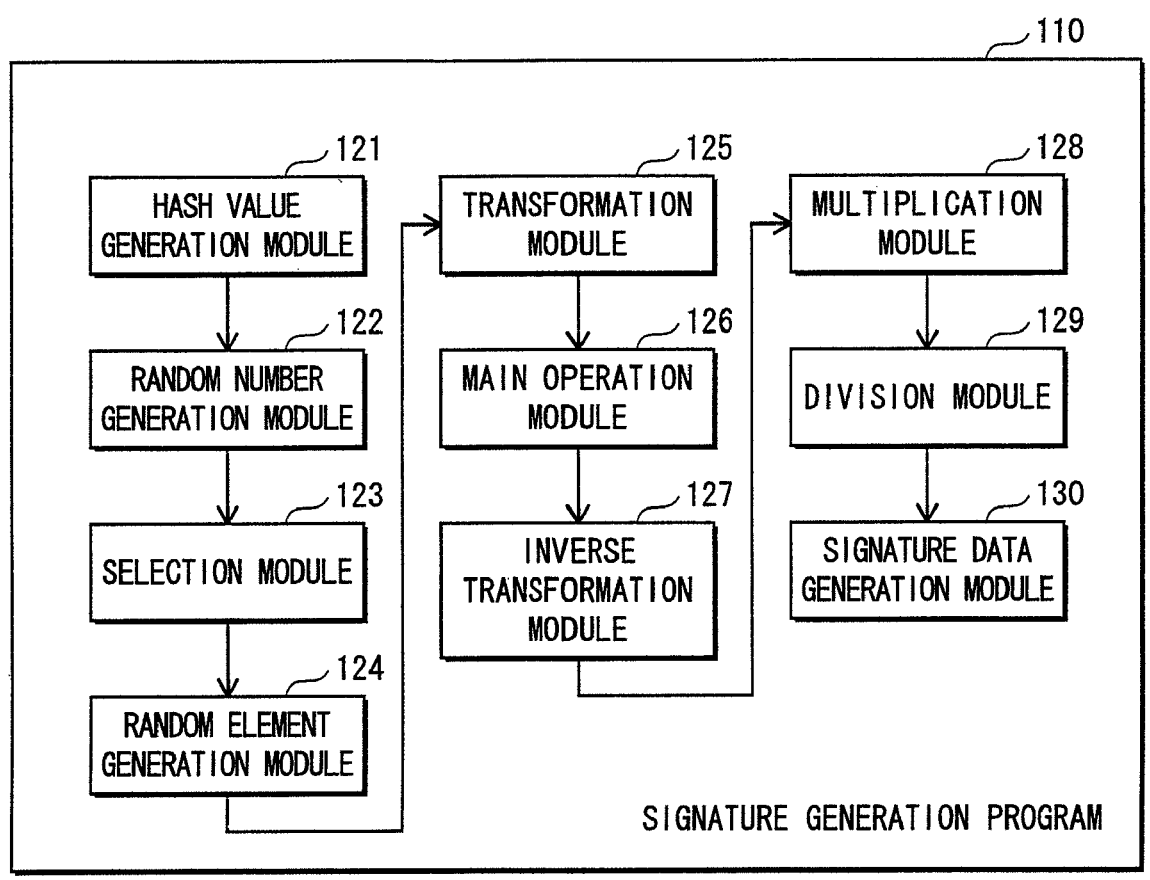
FIG. 4 shows modules in a signature generation program 110.

As shown in FIG. 4, the signature generation program 110 is composed of a hash value generation module 121, a random number generation module 122, a selection module 123, a random element generation module 124, a transformation module 125, a main operation module 126, an inverse transformation module 127, a multiplication module 128, a division module 129, and a signature data generation module 130.

The signature generation program 110 is a program that outputs signature data S(=(r,s)) with respect to an input message m.

Each of the modules is a computer program composed of a combination of machine language instruction codes. The machine language is in a format that can be decoded and executed by the processor 101.

(6-1) Hash Value Generation Module 121

The hash value generation module 121 receives input of the message m from the message reception apparatus 30, an applies a hash function to the received message m, thereby calculating a hash value h of the message m. The hash function may, for instance, be SHA-1.

The hash value generation module 121 outputs the hash value h to the transformation module 125.

(6-2) Random Number Generation Module 122

The random module generation unit 122 generates a len-bit random positive integer (random number) u, and outputs the generated random number u to the selection module 123.

(6-3) Selection Module 123

The selection module 123 receives the random number u from the random number generation module 122, and transforms the received random number u into a bit expression.

With respect to the random number u that has been transformed into a bit expression, specifically u=u_0+u_1×2+u_2×2^2+ ... +u_(len−1)×2^(len−1), the selection module 123 selects PP_(u_0,0), PP_(u_1,1), PP_(u_2,2), ..., PP_(u_(len−1),len−1) from the table memory unit 102 (here, u_=0 or 1 with respect to i=0, 1, 2, ..., len−1).

Here, the value of the suffix k (k=0, 1, ..., len−1) in u_k is corresponded with one of the table names in one of the tables stored in the table memory unit 102. In other words, u_0 is corresponded with table 0, u_1 with table 1, ..., and u_len−1 with table len−1.

The selection module 123 outputs the selected PP_(u_0, 0), PP_(u_1,1), PP_(u_2,2), ..., and PP_(u_(len−1), len−1) to the random element generation module 124.

(6-4) Random Element Generation Module 124

The random element generation module 124 receives the len element pairs PP_(u_i,i)=(P_(u_i,i), Pa_(u_i,i)) from the selection module 123, and with use of the parameters a and b of the elliptic curve E, the prime p and the base point P of the elliptic curve E stored in the public parameter memory unit 104, adds P_(u_i, i) included in each received element pair on the elliptic curve E. This calculates Pk (=(v_(u_0,0)*P+v_(u_1,1)*P+ ... +v_(u_len−1,len−1)*P) (here, i=0, 1, 2, ..., len−1). It should be noted that Pk=(v_(u__0,0)+v_(u__1, 1)+ ... +v_(u_(len−1),len−1)*P.

With use of the parameters aa and ba of the elliptic curve Ea and the composite number n stored in the public parameter memory unit 104, the random element generation module 124 adds Pa_(u_i,i) mod n (i=0, 1, 2, ..., len−1), the result being Pak mod n (=(v_(u__0,0))*Pa+v_(u__1,1)*Pa+ ... +v_(u_len−1,len−1)*Pa)). Note that Pak=(v_(u__0,0)+v_(u__1,1)+ ... + v_(u_(len−1),len−1))*Pa here.

The random element generation module 124 outputs the calculated Pk to the main operation module 126, and outputs the calculated Pak to the inverse transformation module 127.

(6-5) Transformation Module 125

Upon receiving the hash value h from the hash value generation unit 121, the transformation module 125 calculates hPa=h*Pa mod n with use of the received hash value h, and the parameters aa and ba of the elliptic curve Ea, the composite number n and the point Pa on the elliptic curve Ea stored and the public parameter memory unit 104.

The transformation module 125 outputs the calculated Pa to the main operation module 126.

(6-6) Main Operation Module 126

The main operation module 126 receives Pk from the random element generation module 124, and receives hPa from the transformation module 125.

The main operation module 126 calculates r=x(Px)mod q, where x(Pk) represents the x coordinate of Pk.

The main operation module 126 calculates r*KST on the elliptic curve Ea with use of the transformed private key KST stored in the transformed private key memory unit 105, and the parameters aa and bb of the elliptic curve Ea and the composite number n stored in the public parameter memory unit 104. The main operation module 126 then adds r*KST and hPa on the elliptic curve Ea, the result being Qa=r*KST+ hPa.

The main operation module 126 outputs the calculated r to the signature data generation module 130, and outputs the calculated Qa to the inverse transformation module 127.

(6-7) Inverse Transformation Module 127

The inverse transformation module 127 receives Pak from the random element generation module 124, and receives Qa from the main operation module 126.

With use of the prime p1 stored in the private parameter memory unit 103, the inverse transformation module 127 calculates the discrete logarithm cQ of Qa with respect to Pa mod p1, and the discrete logarithm ck of Pak with respect to Pa mod p1.

The inverse transformation module 127 outputs the calculated discrete logarithms cQ and ck to the multiplication module 128.

First a description is given of the processing for calculating the discrete logarithm cQ of Qa.

Step S20: Calculate Qa1=Qa mod p1, Pa1=Pa mod p1.

Step S21: Calculate discrete logarithm cQ of Qa1 with respect to Pa1 (in other words, cQ that satisfies Qa1=cQ*Pa1).

Next, a description is given of the processing for calculating the discrete logarithm ck of Pak.

Step S30: Calculate ck1=Pak mod p1, Pa1=Pa mod p1.

Step S31: Calculate the discrete logarithm ck of ck1 with respect to Pa1 (in other words, ck that satisfies ck1=ck*Pa1).

The discrete logarithms cQ and ck calculated at steps S21 and S31 are solutions of a discrete logarithm problem on an anomalous elliptic curve.

Details of how to solve the discrete logarithm problem on an anomalous elliptic curve can be found on pages 88 to 91 of Non-Patent Document 3. Furthermore, the calculation method is also given in this document, and therefore a description thereof is omitted here.

Note that it is assumed that the inverse transformation module 127 is executed in an area made tamper resistant either through hardware or software, or both, in order to make the processing contents difficult to analyze.

(6-8) Multiplication Module 128

Upon receiving the discrete logarithms cQ and ck from the inverse transformation module 127, the multiplication module 128 generates a random number $\beta$.

Using the order q of the base point P of the elliptic curve E stored in the public parameter memory unit 104, the multiplication module 128 multiplies each of the discrete logarithms cQ and ck with the generated $\beta$, thereby calculating cQ'=cQ×$\beta$ mod q and ck'=ck×$\beta$ mod q.

The multiplication module 128 outputs the calculated cQ' and ck' to the division module 129.

Note that it is assumed that the multiplication module 128 is executed in an area made tamper resistant either through hardware or software, or both, in order to make the processing contents difficult to analyze.

(6-9) Division Module 129

The division module 129 receives cQ' and ck' from the multiplication module 128.

The division module 129 calculates the inverse element cki of ck' in mod q. Here, cki×ck'=1 mod q is satisfied.

The division module 129 multiplies cki and cQ', and applies mod q to find s=cki×cQ' mod q. Details of calculation of inverse elements can be found in Non-Patent Document 2.

The division module 129 outputs the calculated s to the signature data generation module 130.

(6-10) Signature Data Generation Module 130

The signature data generation module 130 receives r from the main operation module 126, and receives s from the division module 129.

Treating r received from the main operation module 130 and s received from the division module 129 as a pair, the signature data generation module 130 generates signature data S=(r,s).

The signature data generation module 130 outputs the message m received by the hash value generation module 121 and the generated signature data S to the signature data transmission apparatus 40.

1.4 Structure of Table Generation Module 20

A description is now given of the table generation apparatus 20.

Figure 5:
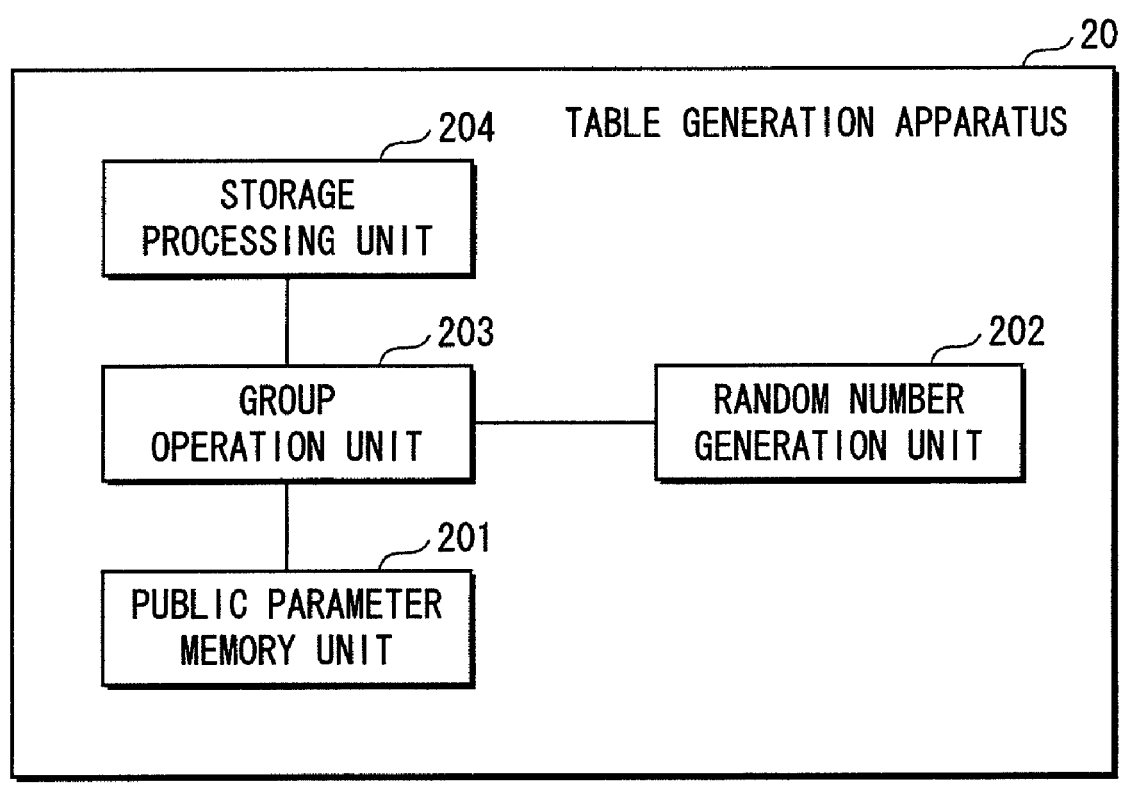
FIG. 5 is a block diagram showing the structure of a table generation apparatus 20.

As shown in FIG. 5, the table generation apparatus 20 is composed of a public parameter memory 201, a random number generation unit 202, a group operation unit 203, and a storage processing unit 204.

(1) Public Parameter Memory Unit 201

The public parameter memory unit 201 stores, as parameters, variables a and b in the formula $y^2=x^3+a\times x+b$ of the elliptic curve E, a prime p, the base point. P of the elliptic curve E and the order q thereof, variables aa and ba in the formula $y^2=x^3+aa\times x+ba$ of the elliptic curve Ea, a composite number n, and a point Pa on the elliptic curve Ea. Note that here storing a point refers to storing the coordinates of the point.

(2) Random Number Generation Unit 202

The number generation unit 202 generates 2×len len-bit random numbers v_(i,j) (i=0 or 1, j=0, 1, ..., len−1).

The random number generation unit 202 generates one len-bit random number ks, where 0<ks<q.

Note that the random number ks generated by the random number generation unit 202 is used as the private key ks.

(3) Group Operation Unit 203

With use of the parameters a and b of the elliptic curve E, the prime p and the base point P stored in the public parameter memory unit 201, the group operation unit 203 calculates scalar multiples $v\_(i,j)*P$ corresponding to the random numbers $v\_(i,j)$ (i=0 or 1, j=0, 1, ..., len−1).

With use of the parameters aa and bb of the elliptic curve Ea, the composite number n and the point Pa on the elliptic curve Ea stored in the public parameter memory unit 201, the group operation unit 203 calculates scalar multiples $v\_(i,j)*Pa$ corresponding to the random numbers $v\_(i,j)$ (i=0 or 1, j=0, 1, ..., len−1).

The group operation unit 203 generates the tables T101, T102, ..., T103 shown in FIG. 3, with use of the generated scalar multiples $v\_(i,j)*P$ and $v\_(i,j)*Pa$. As a result of this, the group operation unit 203 generates 2×len element pairs.

The group operation unit 203 calculates a scalar multiple KST=ks*Pa with respect to the random number ks, with use of the parameters aa and bb of the elliptic curve Ea, the composite number n and the point Pa on the elliptic curve Ea stored in the public parameter memory unit 201.

Note that the calculated scalar multiple KST will be the converted private key KST.

(4) Storage Processing Unit 204

The storage processing unit 204 stores the tables T101, T102, ..., T103 generated in the group processing unit 203 to the table memory unit 102 of the signature generation apparatus 10. As a result, the storage processing unit 204 is able to store the element pairs ($v\_(i,j)*P$, $v\_(i,j)*Pa$) (i=0 or 1, j=0, 1, ..., len−1).

The storage processing unit 204 stores KST (=ks*Pa) calculated in the group operation unit 203 to the converted private key memory unit 105 of the signature generation unit 10.

1.5 Operations of the Signature Generation Apparatus 10

A description is now given of operations for generating signature data in the signature generation apparatus 10. Note that it is assumed that len−1 tables T101, T102, ..., T103 are stored in advance in the table memory unit 102 by the table generation apparatus 20, and that the transformed private key KST is stored in advance in the transformed private key memory unit 105 by the table generation apparatus 20.

(1) Overview of Operations

The processor 101 of the signature generation apparatus 10 reads and interprets one computer instruction at a time from the signature generation program 110 stored in the program memory unit 106, and, in accordance with each result of the interpretation, generates signature data S with respect to the message m while reading from the table memory unit 102, the private parameter memory unit 103, the public parameter memory unit 104 and the converted private key memory unit 105. Specific operations of processing for generating the signature data S are described below.

(2) Operations for Signature Generation Processing

Figure 6:
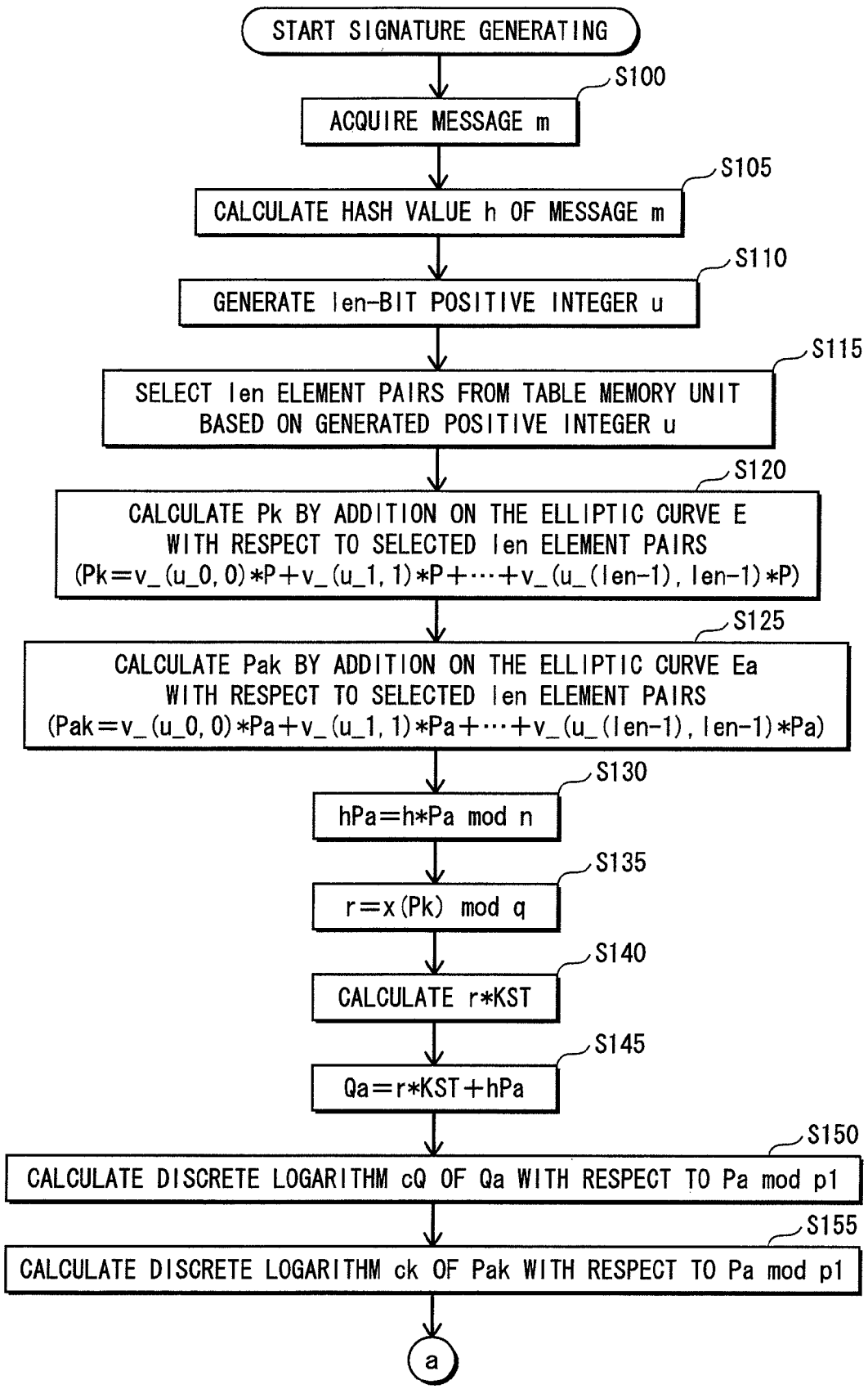
FIG. 6 is a flowchart showing operations for signature generation processing, and continues in FIG. 7
Figure 7:
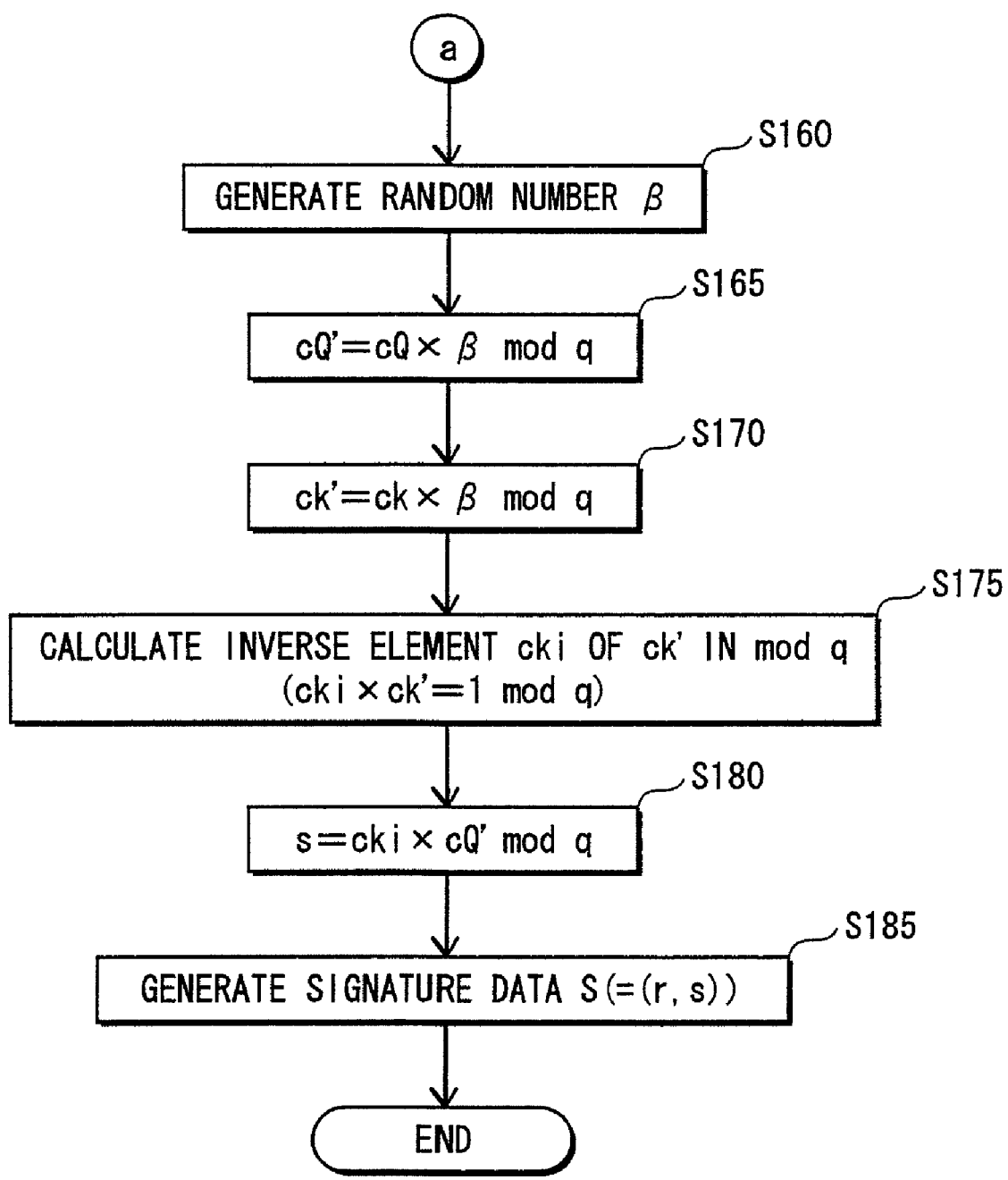
FIG. 7 is a flowchart showing operations for signature generation processing, and is a continuation of FIG. 6.

Referring to the flowchart of FIG. 6 and FIG. 7, a description is now given of operations for signature generation processing for generating signature data S.

The hash value generation module 121 receives an input of the message m from the message reception apparatus 30 (step S100), and calculates the hash value h of the received message m (step S105).

The random generation module 122 generates a len-bit positive integer (random number) u (step S110).

The selection module 123 selects element pairs PP_(u_0, 0), PP_(u_1,1), PP_(u_2,2), ..., PP_(u_(len−1),len−1) based on the bit expression of the random number u (u=u_0+u_1×2+u_2×2^2+ ... u_(len−1)×2^(len−1) (u_i=0 or 1 with respect to i=0, 1, 2, ..., len−1) (step S115).

With respect to PP_(u_i,i)=(P_(u_i,i), Pa_(u_i,i)) (i=0, 1, 2, ..., len−1) selected by the selection module 123, the random element generation module 124 adds P_(u_i,i) (i=0, 1, 2, ..., len−1) on the elliptic curve E with use of the parameters a and b of the elliptic curve E, the prime p and the base point P on the elliptic curve E stored in the public parameter memory unit 104, thereby calculating Pk(=(v_(u_0,0)*P+v_(u_1,1)*P+ ... +v_(u_len,len−1)*P) (step S120).

The random element generation module 124 adds Pa_(u_i, i)mod n (i=1, 2, ..., len−1) on the elliptic curve Ea with use of the parameters aa and ba of the elliptic curve Ea and the composite number n stored in the public parameter memory unit 104, thereby calculating Pak(=(v_(u_0,0)*Pa+v_(u_1, 1)*Pa+ ... +v_(u_len−1,len−1)*Pa) (step S125).

The conversion module 125 calculates hPa=h*Pa mod n with use of the parameters aa and ba of the elliptic curve Ea, the composite number n, the point Pa on the elliptic curve Ea and the hash value h stored in the public parameter memory unit 104 (step S130).

The main operation module 126 calculates r=x(Pk)mod q (step S135). Here, x(Pk) represents the x coordinate of Pk.

The main operation module 126 calculates r*KST on the elliptic curve Ea with use of the transformed private key KST stored in the transformed private key memory unit 105, and the parameters aa and bb of the elliptic curve Ea and the composite number n stored in the public parameter memory unit 104 (step S140).

The main operation module 126 calculates Qa=r*KST+hPa by adding KST and hPa on the elliptic curve Ea (step S145).

The inverse transformation module 127 calculates a discrete logarithm cQ with respect to Pa mod p1, with use of the prime p1 stored in the private parameter memory unit 103 (step S150).

The inverse transformation module 127 calculates a discrete logarithm ck of Pak with respect to Pa mod p1, with use of the prime p1 stored in the private parameter memory unit 103 (step S155).

The multiplication module 128 generates a random number β (step S160).

The multiplication module 128 calculates cQ'=cQ'=cQ×β mod q with use of the order q of the base point P of the elliptic curve E stored in the public parameter memory unit 104, the discrete logarithm cQ calculated at step S150, and the random number β (step S165).

The multiplication module 128 calculates ck'=ck×β mod q with use of the order of the base point P on the elliptic curve E stored in the public parameter memory unit 104, the discrete logarithm ck calculated at step S155, and the random number β (step S170).

The division module 129 calculates cki which is the reverse element of ck' calculated at step S170 in mod q (step S175). Here, cki is a value that satisfies cki×ck'=1 mod q.

The division module 129 calculates s=cki×cQ' mod q with use of the order q of the base point P on the elliptic curve E stored in the public parameter memory unit 104, cki calculated at step S175, and cQ' calculated at step S165 (step S180).

The signature data generation module 130 generates signature data S=(r,s) in which r generated at step S135 and s generated at step S180 are a pair (step S185).

The signature data generation module 130 outputs the message m received by the hash value generation module 121 and the generated signature data S to the signature data transmission apparatus 40.

1.6 Operations of the Table Generation Apparatus 20

Figure 8:
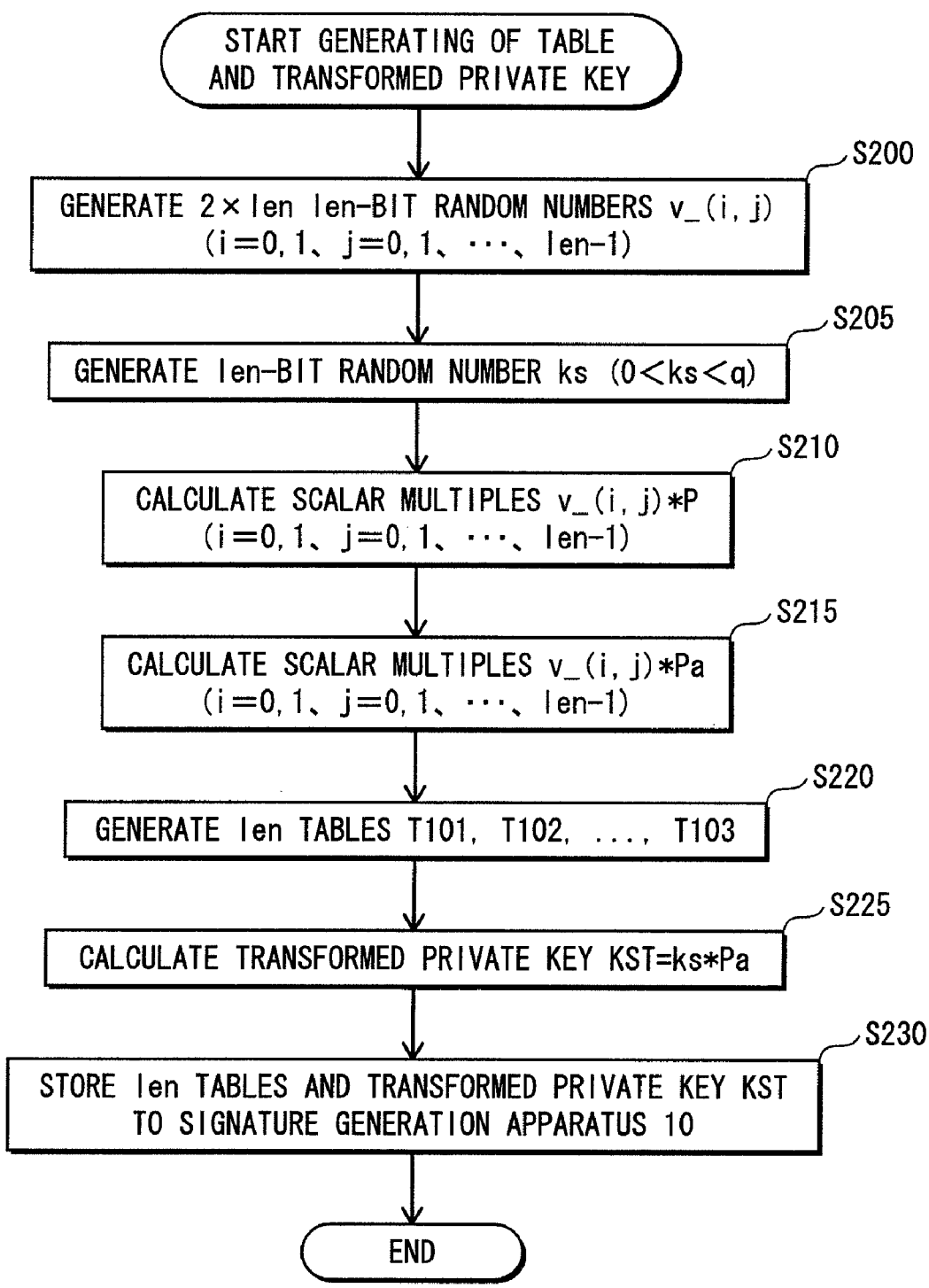
FIG. 8 is a flowchart showing operations by the table generation apparatus 20.

Referring to FIG. 8, a description is now given of operations for generating the tables and the transformed private key in the table generation apparatus 20.

The random number generation unit 202 generates 2×len len-bit random numbers $v\_(i,j)$ ($i=0, 1, j=0, 1, \ldots,$ len−1) (step S200).

The random number generation unit 202 generates one len-bit random number (private key) ks, where ks satisfies $0<ks<q$ (step S205).

The group operation unit 203 calculates scalar multiples $v\_(i,j)*P$ corresponding to random numbers $v\_(i,j)$ ($i=0, 1, j=0, 1, \ldots,$ len−1), with use of the parameters a and b, the prime p and the base point P stored in the public parameter memory unit 201 (step S210).

The group operation unit 203 calculates scalar multiples $v\_(i,j)*Pa$ corresponding to the random numbers $v\_(i,j)$ ($i=0, 1, j=0, 1, \ldots,$ len−1), with use of the parameters aa and bb of the elliptic curve Ea, the composite number n and the point Pa on the elliptic curve Ea stored in the public parameter memory unit 201 (step S215).

The group operation unit 203 generates len tables T101, T102, ..., T103 with use of the generated scalar multiples $v\_(i,j)*P$ and scalar multiples $v\_(i,j)*Pa$ (step S220).

The group operation unit 203 calculates scalar multiple (transformed private key) KST=ks*Pa with respect to the random number ks, with use of the parameters aa and bb of the elliptic curve Ea, the composite number n and the point Pa on the elliptic curve (step S225).

The storage processing unit 204 stores the tables T101, T102, ..., T103 generated in at step S220 to the table memory unit 102 of the signature generation apparatus 10, and stores KST(=ks*Pa) calculated at step S225 to the transformed private key memory unit 105 of the signature generation apparatus 10 (step S230).

As a result, the storage processing unit 204 stores the element pairs $(v\_(i,j)*P, v\_(i,j)*Pa)$ ($i=0$ or $1, j=0, 1, \ldots,$ len−1) to the table memory unit 102 of the signature generation apparatus 10.

1.7 Operation Verification in the Preferred Embodiment

A description is now given of how the signature generation program 110 in the described preferred embodiment generates a signature identical to that generated in a conventional elliptic DSA signature scheme.

The signature generation program 110 calculates a random point Pk in the random element generation module 124. In the random element generation module 124, the signature generation program 110 further calculates Pak on the super anomalous elliptic curve Ea.

In each pair of elements in the table memory unit 102, the point on the elliptic curve E and the point on the super anomalous curve Ea have the same value of discrete logarithm with respect to the point P and the point Pa, respectively. In other words, since an element pair is selected by the selection module 123, and the points included in the selected element pair are added on the elliptic curves E and Ea respectively by the random element generation module 124, the discrete logarithm of Pk with respect to P and the discrete logarithm of Pak with respect to Pa are the same value (here, $v\_(u\_0,0)+v\_(u\_1,1)+ \ldots +v\_(u\_len-1,len-1)$). If the discrete logarithms are considered to be the random number k generated in step S2 in the conventional elliptic DSA signature generation scheme, S=(r,s) generated by the signature generation program 110 will be the same as the signature S generated in the signature generating in the conventional DSA signature scheme.

The following shows that S=(r,s) generated by the signature generation program 110 and the signature S generated in the signature generation of the conventional DSA signature scheme will be the same.

Consider the discrete logarithm cQ of the point Qa with respect to the point Pa. As has been described, Qa=r*KST+hPa, and KST=ks*Pa, hPa=h*Pa. It can be seen from this that Qa=(r×ks+h)*Pa. Therefore, the discrete logarithm cQ of the point Qa with respect to the point Pa is cQ=r×ks+h. Furthermore, the discrete logarithm ck of the point Pak with respect to the point Pa is ck=k.

The reason for this is as follows.

Given that ck1=Pak mod p1 and Pa1=Pa mod p1 according to step S30 and that ck1=ck*Pa1 according to step S31, then ck1=Pak mod p1=ck*Pa mod p1. On the other hand, according to the method of calculating Pak, Pak=k*Pa mod n. Here, given that n=p1×p2, then (Pak mod n)mod p1=Pak mod p1, and ck1=Pak mod p1=k*Pa mod p1. Hence, according to this expression, ck1=ck*Pa1=ck*Pa mod p1=k*Pa mod p1, and it can be seen that ck=k according to this expression.

As shown above in "(6-9) Division module 129", since s=ckixcQ' mod q=cQ'/ck' mod q=cQ×β/(ck×β)mod q=(r×ks+h)/k mod q, the value calculated by the division module 129 is the value s found in step S4 of the signature generation in the conventional elliptic DSA signature scheme.

Furthermore, the value r calculated in the main operation module 126 of the signature generation program 110 is the k multiple of the point P the same as in the signature generation in the conventional elliptic DSA signature scheme.

Therefore, the set of the value r calculated by the main operation module 126 and the value s calculated by the division module 129 are identical to the signature S generated in the signature processing in the conventional elliptic DSA signature scheme.

The above description shows that the signature generation program 110 of the preferred embodiment can generate a signature correctly.

1.8 Effects of the Preferred Embodiment

If the private parameter memory unit 103, and the inverse transformation module 127 and the multiplication module 128 of the signature generation program 110 are difficult to analyze, p1 and p2, which are the factors of n, will not be known to an analyzer, and therefore the analyzer will not be able to solve the discrete logarithmic problem on the super anomalous elliptic curve. Although the analyzer may be able to analyze the transformed private keys KST and Pak, since he/she will not be able to solve the discrete logarithmic problem on the super anomalous elliptic curve, he/she will not be able to find the private key ks and the discrete logarithm of Pak based on the transformed private keys KST and Pak.

The reason for designing a system in which the discrete logarithm k of Pak cannot be found is as follows. An analyzer is able to find out k, he/she will be able to find out r, s, h and g, and therefore he/she will be able to find the private key ks from s=(r×ks+h)/k mod q. For this reason it is necessary to design the system such that the discrete logarithm k of Pak cannot be found.

In signature generation in the conventional elliptic DSA signature scheme, it is also necessary to ensure that not only the private key ks, but also the random number k is secret.

This is because it is possible for an analyzer (an attacker) to discover the values h, r and s, and therefore if he/she also manages to find out the random number k, it will be possible for him/her to calculate the private key ks according to step S4.

For these reasons, the present invention makes it difficult for an analyzer to carry out analysis in steps S2 and S4 that use the random number k and the private key ks.

As has been described, the present invention makes analysis of step S4 difficult by utilizing homomorphic transformation that uses a super anomalous elliptic curve to transform the private key ks and the random number k into points on the super anomalous elliptic curve. This means that the signature generation system of the preferred embodiment is secure because the analyzer will not be able to find out the private key ks.

Figure 9:
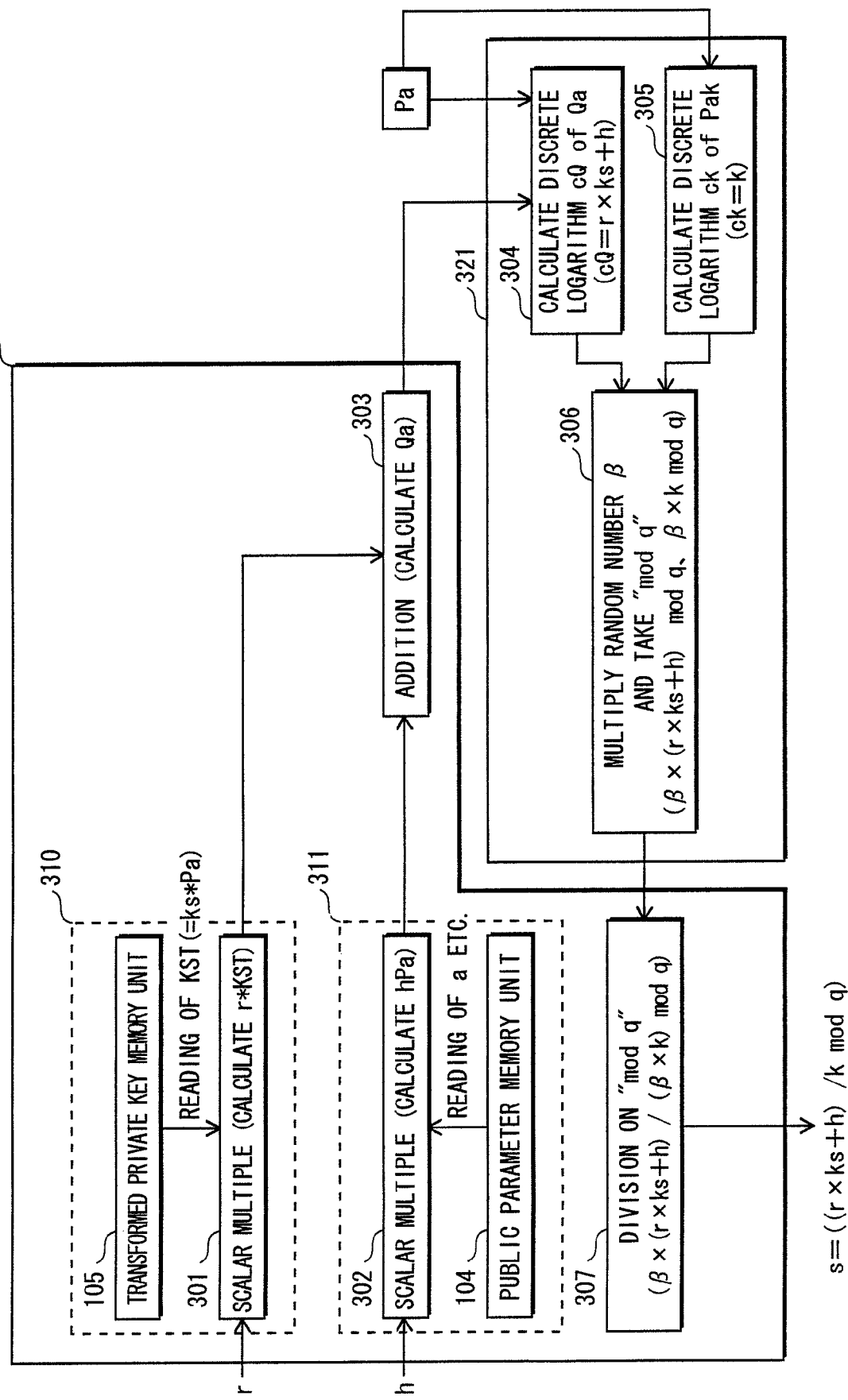
FIG. 9 shows an overview of operations when generating a value $s(=(r \times ks+h)/k \mod q)$ from values r and h in the present invention.

Referring to FIG. 9, a description is now given of the correspondence between a conventional elliptic DSA signature scheme and the DSA signature scheme of the present invention.

FIG. 9 shows the parts of the operations of the elliptic DSA signature scheme of the present invention that correspond to step S4 in the signature generation in the conventional elliptic DSA signature scheme.

A processing group 310 surrounded by a broken line in FIG. 9 corresponds to step S140 in FIG. 6. The processing group 310 is composed of the transformed private key memory unit 105 and a processing group 301 for calculating r*KST.

A processing group 311 corresponds to step S130. The processing group 311 is composed of the public parameter memory unit 104 and a processing group 302 for calculating hPa.

A processing group 303 is for adding results of the processing group 310 and the processing group 311, and corresponds to step S145.

A processing group 304 is for calculating the discrete logarithm cQ, and corresponds to step S150. A processing group 305 is for calculating the discrete logarithm ck, and corresponds to step S155.

A processing group 306 is for multiplying β with the respective calculation results of the processing group 304 and the processing group 305, and corresponds to step S160 to step s170.

A processing group 307 is for calculating data sin the signature data S=(r,s), and corresponds to steps S175 and S180.

A processing group 320 is executed in an analyzable area. A processing group 321 is executed in an area that is made tamper-resistant by hardware countermeasures, software countermeasures, or both, in order to make the contents of the processing difficult to analyze as described earlier.

As described, since the private key ks is transformed into KST(=ks*Pa) and stored in advance, and the private key ks itself does not appear when signature generation is performed, the private key ks will not be found out by an analyzer. Furthermore, the random number k does not appear as is in an analyzable area, but is transformed into a point on a super anomalous elliptic curve in the analyzable area, and therefore is difficult to analyze.

Furthermore, by utilizing homomorphic transformation that uses a super anomalous elliptic curve, it is k*P on the anomalous elliptic curve Ea that is needed instead of the random number k, and then k*Pk of the elliptic curve E and k*Pa in the anomalous elliptic curve Ea that is needed for performing signature generation according to an elliptic DSA signature scheme to calculate k.

In view of this, the present invention calculates k*P and K*Pa using the table memory unit 102, the random number generation module 122, the selection module 123 and the random element generation module 124, without generating and using k. Such a structure means that, in contrast to the conventional elliptic DSA signature scheme by which the random number k appears when R (=k*P) is calculated in step S2, in the present invention Pk (=k*P) is calculated without the random number k appearing, and therefore k cannot be found when Pk is being calculated. It is also difficult to find k from the result of this calculation.

Conventionally, in order to make analysis of the private key ks and the random number k difficult, it is necessary to apply a hardware countermeasure in step S2 and step S4. However, in the present invention, it is sufficient to apply a hardware countermeasure to make it difficult to analyze the parts of the operations that solve the discrete logarithmic problem and use the solution (i.e., the program groups 304, 305 and 306). This means that a hardware countermeasure need only be applied to a limited number of parts, and the signature generation apparatus can therefore be implemented more easily than with conventional techniques.

Figure 10:
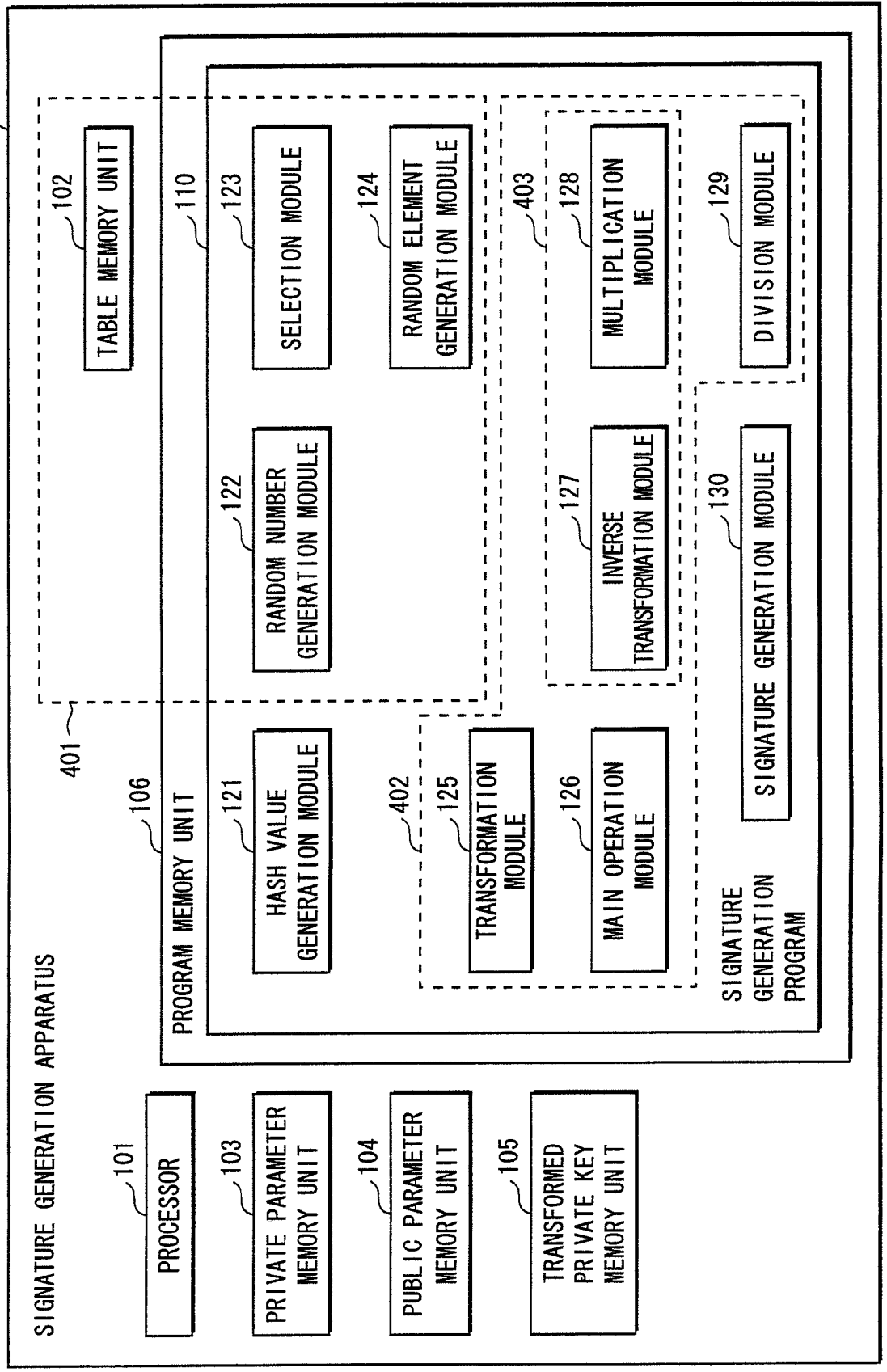
FIG. 10 shows characteristic portions of a DSA elliptic signature scheme of the present invention.

Furthermore, FIG. 10 shows the correspondence between the steps in the signature generation in the conventional elliptic DSA signature method and the operations of the compositional elements of the signature generation apparatus 10 of the present invention. Note that the connecting lines between the compositional elements are shown in FIG. 2 and FIG. 4, and therefore are omitted in FIG. 10.

Equivalent operations to step S1 are realized by the hash value generation module 121.

Equivalent operations to step S2 are realized by a structural group 401 composed of the table memory unit 102, the random number generation module 122, the selection module 123 and the random element generation module 124.

Equivalent operations to step S3 are realized according to the calculation of the value r performed in the main operation module 126.

Equivalent operations to step S4 are realized according to a structural group 402 composed of a transformation module 125, a main operation module 126, an inverse transformation module 127, a multiplication module 128 and division module 129.

Equivalent operations to step S5 are realized according to the signature data generation module 130.

The private parameter memory unit 103, the public parameter memory unit 104 and the transformed private key memory unit 105 are used in accordance with the operations of the modules.

A structural group 402 composed of the inverse transformation module 127 and the multiplication module 128 is the part to which, as described, a hardware countermeasure needs to be applied to make this part difficult to analyze.

Note that the countermeasure to make the analysis difficult is not limited to being a hardware countermeasure. Any other countermeasure that makes analysis difficult may be used.

1.9 Modifications

The described embodiment is simply one example of implementation of the present invention. The present invention is by no means limited to the described embodiment, and may be implemented in any of various forms as long as such form does not depart from the scope of the present invention. For instance, cases such as the following are included in the present invention.

(1) Although the bit length len of p, q and u is 160 in the described embodiment, the bit length len may be greater than 160, for instance 192 or 224. Furthermore, the number of bits of n is not limited to 1024, and may be greater than 1024, for instance 2048 or 4096.

(2) Although the described embodiment is in the form of a signature generation program, this may instead be an encryption program or a decryption program.

(3) Although the in the described embodiment a group of the elliptic curve Ea is used as the second group, the present invention is not limited to this. Another group such as a multiplicative group of a residue integer ring may be used as the second group.

Furthermore, the integers are not limited to being transformed according to scalar multiplication operations on an elliptic curve as in the embodiment. A power operation of a group may be used as the operation for transforming integers. Here, the power operation is an operation for finding the result of performing a basic operation of the group an integral number of times. Specifically, the basic operation is multiplication in the case of a residue integer ring, and is addition on an elliptic curve in the case of a group of an elliptic curve. Therefore, the power operation of the multiplicative group of the residue integer ring is an exponentiation, and the power operation of the group of the elliptic curve is a scalar multiplication of the elliptic curve. In the embodiment, the second group Ga is Ea(GF(p1))×Ea(GF(p2)), and the discrete logarithm problem is solved with Ea(GF(p1)) which is a subgroup of this second group. However, the discrete logarithm problem may be solved in a subgroup of a multiplicative group of a residue integer ring Z/nZ or another group. Furthermore, the second group may be a multiplicative group of a residue integer group as in Patent Document 3.

(4) Although the second group Ga is described as being a group of the elliptic curve over Z/nZ with respect to the composite number n (=p1×p2) in the embodiment, the second group Ga is not limited to this. Note that p1 and p2 are mutually different primes.

The second group Ga may be a group of an elliptic curve over Z/nZ with respect to a composite number n (=p1^m×p2), where m is an integer 1 or greater. Here, p1^m denotes the m-th power of p1.

Alternatively, the second group Ga may be a multiplicative group of Z/nZ with respect to a composite number n (=p1^m× p2), where m is an integer 1 or greater. In this case, a subgroup of the second group may be a multiplicative group of Z/p1^m Z.

(5) Although the signature generation apparatus 10 generates two random elements (Pk and Pak) in the random element generation module 124, the random element generation module 124 is not limited to this.

It is possible for the random element generation module 124 to generate only one random element (for example, Pk). In such a case, the signature generation apparatus 10 stores 2×len elements P_(i,j) instead of 2×len element pairs (i=0, 1, j=0, 1, . . . , len−1). After generating a len-bit random number u, the signature generation apparatus 10 calculates an element Pk of the first group G using the generated random number u. The calculation method is the same as in the described embodiment, and therefore a description thereof is omitted here. Accordingly, the signature generation apparatus 10 is able to calculate an element Pk of the first group G such that the random number k is not known to a third party.

As a further alternative, the random number generation module 124 may generate two or more random number elements (Pk, Pak1, Pak2, . . . , Pakn) (n being an integer 1 or greater).

(6) Although in the embodiment the selection module 123 of the signature generation apparatus 10 transforms the positive integer u generated by the random number generation module 122 into an len-bit bit expression and selects the element pairs corresponding to the bits in this bit expression, the selection module 123 is not limited to this.

The selection module 123 may find element pairs directly from the positive integer u generated by the random number generation module 122.

In this case, the table memory unit 102 stores integer pairs (v_1*P,v_1*Pa), (v_2*P,v_2*Pa), (v_3*P,v_3*Pa) in correspondence with positive integers 1, 2, 3, . . . .

The selection module 123 selects an element pair (v_u*P, v_u*Pa) corresponding to the positive integer u generated by the random number generation module 122, from the table stored in the table memory unit 102.

In the random element generation module 124, Pk=v_u*P and Pak=v_u*Pa in the selected element pair (v_u*P, v_u*Pa).

Subsequent operations are the same as in the embodiment, and therefore a description thereof is omitted.

The following describes a different example.

Alternatively, the table memory unit 102 stores element pairs (v_1*P,v_1*Pa), (v_2*P,v_2*Pa), (v_3*P,v_Pa), . . . , (v_t*P, v_t*Pa), where t is an integer 1 or greater.

The selection module 123 selects one or more element pairs in the following manner.

When the integer u is t or less, the selection module 123 selects the element pair (v_u*P, v_u*Pa) from the table in the table memory unit 102.

When the integer u is greater than t, the selection module 123 acquires t1, t2, . . . , tp by which u=t1+t2+ . . . tp, where p is an integer 2 or greater, and each of t1, t2, . . . , tp is t or less. The selection module 123 selects the element pairs (v_t1*P, v_t1*Pa), (v_t2*P, v_t2*P2), . . . , (v_tp*P, v_tp*Pa) correspondingly respectively to the acquired t1, t2, . . . , tp from the table stored in the table memory unit 102.

When the number of element pairs selected is 1, in the random element generation module 124, Pk=v_u*P and Pak=v_u*Pa in (v_u*P, v_u*Pa).

When the number of element pair selected is 2 or greater, the random element generation module 124 calculates Pk by adding v_t1*P, v_t2*P, . . . , v_tp*P with respect to the selected element pairs (v_t1*P, v_t1*Pa), (v_t2*P, v_t2 *Pa), . . . , (v_tp*P, v_tp*Pa) on the elliptic curve E, and calculates Pak by adding v_t1*Pa, v_t2*Pa, . . . , v_tp*Pa on the elliptic curve Ea.

Subsequent operations are the same as in the embodiment, and therefore a description thereof is omitted.

(7) Although in the embodiment the random element generation module 124 calculates Pk and Pak using all of the len element pairs selected by the selection module 123, the random element generation module 124 is not limited to this.

The random element generation module 124 may select w element pairs from the selected len element pairs, and calculate Pk and Pak using the selected w element pairs. Here, w is a number equal to or greater than 2 and equal to or less than len.

As one example, the number w may be provided in advance, and the random element generation module 124 may select w element pairs at random from the selected len elements.

As a further example, the random element generation module 124 may select only w element pairs that correspond to the bit value "1" from the selected len element pairs, or may select only w element pairs that correspond to the bit value "0" from the selected len element pairs.

Alternatively, the random element generation module 124 may compare the number of bits having the value "1" to the number of bits having the value "0", selects only the w element pairs corresponding to the one of the bit values that is greater in number.

As a further alternative, the number w may be provided in advance, and, from among the selected len element pairs, the random element generation module 124 may select element pairs corresponding to the upper w bits. Note that the random number generation module 124 may instead select element pairs corresponding to the lower w bits.

Although w is described above as being a number equal to or greater than 2 and equal to or less than len, w may be a number equal to or greater than 1 and equal to or less than len. In the case of w=1, in the random element generation module 124, $Pk=v\_u*P$ and $Pak=v\_u*Pa$ in the selected element pair $(v\_u*P, v\_u*Pa)$.

(8) In the present invention, a split group may be the storage content of the table memory unit 102 shown in the embodiment. Alternately, a split group may be a combination of split pairs (in other words, element pairs) with respect to each of positive integers u. In other words, combinations of split pairs selected with respect to each bit of a positive integer u.

(9) Although the signature generation is performed by a signature generation program in the described embodiment, signature generation is not limited to being performed by a signature generation program.

A signature may instead by generated by hardware.

In other words, the modules of the signature generation program may instead be units that achieve the described functions.

(10) Each described apparatus is, specifically, a computer system composed of a microprocessor, a ROM, a RAM, a hard disk unit, a display unit, a keyboard, a mouse, and the like. A computer program is stored in the RAM or the hard disk unit. The computer program is composed of a plurality of instruction codes showing instructions with respect to a computer in order to have predetermined functions achieved. Each apparatus achieves predetermined functions by the microprocessor operating according to the computer programs. In other words, the microprocessor reads one of the instructions included in the computer program at a time, decodes the read instruction, and operates in accordance with the result of the decoding.

(11) All or part of the compositional elements of each apparatus may be composed of one system LSI (Large Scale Integrated circuit). The system LSI is a super-multifunctional LSI on which a plurality of compositional units are manufactured integrated on one chip, and is specifically a computer system that includes a microprocessor, a ROM, a RAM, or the like. A computer program is stored in the RAM. The system LSI achieves its functions by the microprocessor operating according to the computer program.

(12) Part or all of the compositional elements of each apparatus may be composed of a removable IC card or a single module. The IC card or the module is a computer system composed of a microprocessor, a ROM, a RAM, or the like. The IC card or the module may include the aforementioned super-multifunctional LSI. The IC card or the module achieves its functions by the microprocessor operating according to a computer program. The IC card or the module may be tamper-resistant.

(13) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(14) The present invention may be any combination of the above-described embodiment and modifications.

2. Conclusion

The present invention has an object of providing a source code obfuscation method that makes it difficult for an attacker to analyze a program that implements a signature scheme whose security is based on a discrete logarithm problem on a finite field, an elliptic curve or the like (for instance, a DSA signature scheme or an ECDSA signature scheme).

The characteristics of the present invention are as follows.

(1) The present invention is a signature generation program for causing a signature generation apparatus to generate, with use of a private key, a digital signature with respect to a message, wherein the signature generation apparatus comprises: a table memory unit operable to store a plurality of element pairs, each consisting of a first element belonging to a first group G and a second element belonging to a second group Ga; a program memory unit operable to store the signature generation program; and a processor operable to read and interpret one instruction at a time from the signature generation program stored in the program memory unit, and operate in accordance with a result of the interpretation, the signature generation program comprising: an integer generation module operable to generate a first integer; a selection module operable to select, based on the first integer, element pairs from among the plurality of element pairs stored in the table memory unit, and output the selected element pairs; and a group operation module operable to calculate, with use of the element pairs output by the selection module, a third element belonging to the first group G and a fourth element belonging to the second group Ga, wherein the first element is an element obtained by performing, with respect to (a) a first basic element P that is a pre-provided element belonging to the first group G and (b) a power value that is a pre-provided positive integer, a power operation in the first group G of the first basic element P using the power value as a power, and the second element is an element obtained by performing, with respect to (a) a second basic element Pa that is a pre-provided element belonging to the second group Ga and (b) the power value, a power operation in the second group Ga of the second basic element Pa using the power value as a power.

(2) In the signature generation program of (1), the selection module may select one single element pair per bit value of the first integer.

(3) In the signature generation program of (2), the third element may be an element of the first group G obtained as a result of performing a basic operation of the first group G with respect to all elements belonging to the first group G included in the element pairs selected by the selection module, and the fourth element may be an element of the second group Ga obtained as a result of performing a basic operation of the second group Ga with respect to all elements belonging to the second group Ga included in the element pairs selected by the selection module.

(4) In the signature generation program of any of (1) to (3), the signature generation program may further comprise: a transformation module operable to transform an integer into an element belonging to the second group, by performing a power operation on the second group Ga; a main operation module operable to perform a basic operation on the second group Ga; and an inverse transformation module operable to perform an inverse transformation of the transformation performed by the transformation module, in a subgroup Sa of the second group Ga.

(5) In the signature generation program of any of (1) to (4), the signature generation apparatus may further comprise: a transformed private key memory unit operable to store a transformed private key that is an element of the second group, generated from the private key and the second basic element, wherein the signature generation program further comprises: a transformed private key operation module operable to perform a power operation of the second group Ga with use of the transformed private key stored in the transformed private key memory unit.

(6) In the signature generation program of any of (1) to (5), the first group G and the second group Ga may be a multiplicative group of a residue integer ring.

(7) In the signature generation program of (1), the second group Ga may be a multiplicative group Z/nZ with respect to $n = p^m \times q$ expressed using two primes p and q, and a positive integer m, where $x^y$ represents the y-th power of x.

(8) In the signature generation program of (7), the subgroup Sa may be a multiplicative group of $Z/p^m Z$.

(9) In the signature generation program of (8), the positive integer m may be 2.

(10) In the signature generation program of any of (1) to (5), the first group G may be a group of an elliptic curve, and the subgroup Sa may be a group of an anomalous elliptic curve.

(11) In the signature generation program of any of (1) to (5), the second group Ga may be a direct product of two anomalous elliptic curve groups.

(12) In the signature generation program of any of (1) to (5) and either of (11) and (12), the inverse transformation module may comprise a restoration unit operable to restore an element in the second group Ga to an element in the subgroup Sa.

(13) The present invention is an operation program for causing an operation apparatus to perform a group operation, wherein the operation apparatus comprises: a table memory unit operable to store a plurality of element pairs, each consisting of a first element belonging to a first group G and a second element belonging to a second group Ga; a program memory unit operable to store the signature generation program; and a processor operable to read and interpret one instruction at a time from the signature generation program stored in the program memory unit, and operate in accordance with a result of the interpretation, the operation program comprising: an integer generation module operable to generate a first integer; a selection module operable to select, based on the first integer, element pairs from among the plurality of element pairs stored in the table memory unit, and output the selected element pairs; and a group operation module operation to calculate a third element belonging to the first group G and a fourth element belonging to the second group Ga, wherein the first element is an element obtained by performing, with respect to (a) a first basic element P that is a pre-provided element belonging to the first group G and (b) a power value that is a pre-provided positive integer, a power operation in the first group G of the first basic element P using the power value as a power, and the second element is an element obtained by performing, with respect to (a) a second basic element Pa that is a pre-provided element belonging to the second group Ga and (b) the power value, a power operation in the second group Ga of the second basic element Pa using the power value as a power.

(14) The present invention is a signature generation apparatus for generating, with use of a private key, a digital signature with respect to a message, comprising: a table memory unit operable to store a plurality of element pairs, each consisting of a first element belonging to a first group G and a second element belonging to a second group Ga; an integer generation unit operable to generate a first integer; a selection unit operable to select, based on the first integer, element pairs from among the plurality of element pairs stored in the table memory unit, and output the selected element pairs; and a group operation module operable to calculate, with use of the element pairs output by the selection module, wherein the first element is an element obtained by performing, with respect to (a) a first basic element P that is a pre-provided element belonging to the first group G and (b) a power value that is a pre-provided positive integer, a power operation in the first group G of the first basic element P using the power value as a power, and the second element is an element obtained by performing, with respect to (a) a second basic element Pa that is a pre-provided element belonging to the second group Ga and (b) the power value, a power operation in the second group Ga of the second basic element Pa using the power value as a power.

(15) In the signature generation apparatus of (14), the selection unit may select a single element pair per bit value of the first integer.

(16) In the signature generation apparatus of (14) or (15), the third element may be an element of the first group G obtained as a result of performing a basic operation of the first group G with respect to all elements belonging to the first group G included in the element pairs selected by the selection unit, and the fourth element may be an element of the second group Ga obtained as a result of performing a basic operation of the second group Ga with respect to all elements belonging to the second group Ga included in the element pairs selected by the selection unit.

(17) Since the signature scheme in the described signature generation program bases security on the discrete logarithm problem on a finite field or an elliptic curve, analysis by an attacker is made difficult, and therefore the signature scheme in the described signature generation program is of great value.

Furthermore, since the described signature generation apparatus performs signature generation using a signature scheme that bases security on the discrete logarithm problem on a finite field or an elliptic curve, analysis by an attacker is made difficult, and therefore the described signature generation program is of great value.

(18) Furthermore, the present invention is an operation program for applying a power operation that is a basic operation repeated a plurality of times with respect to a basic element P on a group G, with security being based on a discrete logarithm problem on the group G, wherein each of a plurality of split groups is pre-corresponded with a different one of a plurality of numbers, each split group includes a plurality of split values, each split value being an element on a group G calculated by applying a power operation with respect to a basic element P with an arbitrary positive integer as a power, the operation apparatus comprising: a split pair storage unit operable to store a plurality of split groups; a selection unit operable to randomly select a number u from among the plurality of numbers, and select, from the split pair storage unit, a split group corresponding to the selected number u; and a generation unit operable to generate exponential element by applying a basic operation of the group G to all split values included in the selected split group.

(19) As has been described, according to the present invention, not only can the values used in operations be concealed, but also the operations themselves can be concealed.

INDUSTRIAL APPLICABILITY

The apparatuses, methods and computer program of the present invention can be used managerially, in other words, repeatedly and continuously, in various industries in which it is necessary to process information securely and reliably. The apparatuses, methods and computer program of the present invention can also be used managerially, in other words, repeatedly and continuously, in an electrical equipment manufacturing industry.

The invention claimed is:

1. A signature generation apparatus for generating a digital signature for a message by applying a power operation, the power operation being a basic operation performed a plurality of times with respect to a basic element P in a group G and a basic element Pa in a group Ga, and security of the digital signature being based on a discrete logarithm problem of the group G and the group Ga, the signature generation apparatus comprising:
   a split value storage unit storing a plurality of split groups, the plurality of split groups corresponding to a plurality of numbers, such that (i) each split group, of the plurality of split groups, includes a plurality of split pairs, (ii) each split pair, of the plurality of split pairs of each respective split group of the plurality of split groups, includes a first split value and a second split value, (iii) each first split value of the plurality of split groups is an element that belongs to the group G and is calculated by applying, to the basic element P, a power operation in which a power is an arbitrary positive integer, and (iv) each second split value of the plurality of split groups is an element that belongs to the group Ga, wherein each respective second split value is calculated by applying, to the basic element Pa, a power operation in which a power is the arbitrary positive integer used to calculate the first split value of the split pair including the respective second split value;
   a selection unit selecting a number u randomly from among the plurality of numbers, and selecting a split group, of the plurality of split groups, corresponding to the selected number u;
   a generation unit (i) applying a basic operation of the group G to two or more of the first split values in the selected split group, so as to generate a first exponential element, and (ii) applying a basic operation of the group Ga to the second split values in the selected split group that correspond to the two or more first split values in the selected split group, so as to generate a second exponential element; and
   a signature unit (i) transforming each of (a) the generated first exponential element and (b) the message into an element in the group Ga, (ii) applying an operation of the group Ga to the transformed first exponential element, the transformed message and the second exponential element, so as to calculate a first discrete logarithm and a second discrete logarithm, and (iii) generating the digital signature for the message with use of the calculated first and second discrete logarithms.

2. The signature generation apparatus of claim 1, wherein
   each number of the plurality of numbers is a number expressed as a bit string having a predetermined length, the predetermined length being two bits or longer,
   a value of each bit of the bit string of each number corresponds to a split pair of the plurality of split pairs of the plurality of split groups, and
   the selection unit transforms the selected number u into a bit string having the predetermined length, and selects, as the selected split group, a split group composed of split pairs corresponding to the value of each bit in the bit string transformed from the selected number u.

3. The signature generation apparatus of claim 2, wherein
   the generation unit applies the basic operation of the group G to the two or more first split values in the selected split group composed of the split pairs corresponding to the value of each bit, so as to generate the first exponential element, and
   the generation unit applies the basic operation of the group Ga to the second split values in the selected split group composed of the split pairs (i) corresponding to the value of each bit and (ii) corresponding to each of the two or more first split values, so as to generate the second exponential element.

4. The signature generation apparatus of claim 1, wherein
   the first exponential element includes two or more values, and
   the signature unit includes:
   a transformation sub-unit applying the power operation of the group Ga to the basic element Pa with use of a hash value of the message as a power of the power operation, so as to transform the hash value into a transformed hash value belonging to the group Ga;
   a first operation sub-unit calculating first data with use of one value of the two or more values in the first exponential element;
   a second operation sub-unit applying the basic operation of the group Ga to the transformed hash value, so as to calculate a third exponential element belonging to the group Ga;
   an inverse transformation sub-unit applying an inverse operation to each of the second exponential element and the third exponential element in one of the group Ga and a subgroup Sa included the group Ga, so as to find the first and second discrete logarithms, the inverse operation being an inverse of the transformation performed in the transformation sub-unit;
   a third operation sub-unit calculating second data with use of the first and second discrete logarithms; and
   a data generation sub-unit generating the digital signature composed of the first data and the second data.

5. The signature generation apparatus of claim 4, further comprising:
a transformed private key storage unit storing a transformed private key belonging to the group Ga, the transformed private key being generated by applying the basic operation of the group Ga to the basic element Pa using a private key as a power,
wherein the second operation sub-unit applies the basic operation of the group Ga to (i) an operation result that is an element of the group Ga and is obtained by applying, to the transformed private key, a power operation of the group Ga in which the first data is a power and (ii) the transformed hash value, so as to calculate the third exponential element.

6. The signature generation apparatus of claim 5, wherein each of the group G and the group Ga is a multiplicative group of a residue integer ring,
each of the basic operation of the group G and the basic operation of the group Ga is a multiplicative operation that subjects each element in a respective one of the group G and the group Ga to multiplication, and
each of the power operation of the group G and the power operation of the group Ga is an exponentiation having a power value that is a positive integer.

7. The signature generation apparatus of claim 6, wherein the group Ga is a multiplicative group of Z/nZ with respect to n=p^m×q, where p and q are primes, m is a positive integer, "^" is an operator representing exponentiation, "×" is an operator expressing multiplication, Z is an integer ring, and Z/nZ is a residue integer ring.

8. The signature generation apparatus of claim 7, wherein the subgroup Sa is a multiplicative group of Z/p^mZ.

9. The signature generation apparatus of claim 8, wherein m is 2.

10. The signature generation apparatus of claim 4, wherein the group G is a group of an elliptic curve,
the subgroup Sa is a group of an anomalous elliptic curve,
each of the basic operation of the group G and the basic operation of the group Ga is an operation that applies addition on an elliptic curve to each element in a respective one of the group G and the group Ga, and
each of the power operation of the group G and the power operation of the group Ga is an operation that applies multiplication on an elliptic curve to a positive integer.

11. The signature generation apparatus of claim 4, wherein the group G is a group of an elliptic curve,
the group Ga is a direct product of two anomalous elliptic curves,
each of the basic operation of the group G and the basic operation of the group Ga is an operation that applies addition on an elliptic curve to each element in a respective one of the group G and the group Ga, and
each of the power operation of the group G and the power operation of the group Ga is an operation that applies multiplication on an elliptic curve to a positive integer.

12. The signature generation apparatus of claim 4, wherein the inverse transformation sub-unit includes a reduction part reducing an element belonging to the group Ga to an element belonging to the subgroup Sa, and
the inverse transformation sub-unit, with use of the reduction part, reduces each of the second exponential element and the third exponential element to an element belonging to the subgroup Sa, and applies the inverse operation to each of the reduced element belonging to the group Ga, the reduced second exponential element and the reduced third exponential element to find the first discrete logarithm and the second discrete logarithm.

13. A signature generation apparatus for generating a digital signature for a message by applying a power operation, the power operation being a basic operation performed a plurality of times with respect to a basic element P in a group G and a basic element Pa in a group Ga, and security of the digital signature being based on a discrete logarithm problem of the group G and the group Ga, the signature generation apparatus comprising:
a split value storage unit storing a plurality of split groups, the plurality of split groups corresponding to a plurality of numbers, such that (i) each split group, of the plurality of split groups, includes a plurality of split pairs, (ii) each split pair, of the plurality of split pairs of each respective split group of the plurality of split groups, includes a first split value and a second split value, (iii) each first split value of the plurality of split groups is an element that belongs to the group G and is calculated by applying, to the basic element P, a power operation in which a power is an arbitrary positive integer, and (iv) each second split value of the plurality of split groups is an element that belongs to the group Ga, wherein each respective second split value is calculated by applying, to the basic element Pa, a power operation in which a power is the arbitrary positive integer used to calculate the first split value of the split pair including the respective second split value;
a selection unit selecting a number u randomly from among the plurality of numbers, and selecting a split pair, of the plurality of split pairs of the plurality of split groups, corresponding to the selected number u; and
a signature unit (i) transforming each of (a) the message and (b) the first split value in the selected split pair into an element in the group G, (b) applying an operation of the group Ga to the transformed first split value, the transformed message and the second split value in the selected split pair, so as to solve the discrete logarithm problem and calculate first and second discrete logarithms, and (iii) generating the digital signature for the message with use of the calculated first and second discrete logarithms.

14. An integrated circuit of a signature generation apparatus for generating a digital signature for a message by applying a power operation, the power operation being a basic operation performed a plurality of times with respect to a basic element P in a group G and a basic element Pa in a group Ga, and security of the digital signature being based on a discrete logarithm problem of the group G and the group Ga, the integrated circuit comprising:
a split value storage unit storing a plurality of split groups, the plurality of split groups corresponding to a plurality of numbers, such that (i) each split group, of the plurality of split groups, includes a plurality of split pairs, (ii) each split pair, of the plurality of split pairs of each respective split group of the plurality of split groups, includes a first split value and a second split value, (iii) each first split value of the plurality of split groups is an element that belongs to the group G and is calculated by applying, to the basic element P, a power operation in which a power is an arbitrary positive integer, and (iv) each second split value of the plurality of split groups is an element that belongs to the group Ga, wherein each respective second split value is calculated by applying, to the basic element Pa, a power operation in which a power is the arbitrary positive integer used to calculate the first split value of the split pair including the respective second split value;

a selection unit selecting a number u randomly from among the plurality of numbers, and selecting a split group, of the plurality of split groups, corresponding to the selected number u;

a generation unit (i) applying a basic operation of the group G to two or more of the first split values in the selected split group, so as to generate a first exponential element, and (ii) applying a basic operation of the group Ga to the second split values in the selected split group that correspond to the two or more first split values in the selected split group, so as to generate a second exponential element; and a signature unit (i) transforming each of (a) the generated first exponential element and (b) the message into an element in the group Ga, (ii) applying an operation of the group Ga to the transformed first exponential element, the transformed message and the second exponential element, so as to calculate a first discrete logarithm and a second discrete logarithm, and (iii) generating the digital signature for the message with use of the calculated first and second discrete logarithms.

* * * * *